United States Patent
Lee et al.

(10) Patent No.: US 11,895,658 B2
(45) Date of Patent: Feb. 6, 2024

(54) METHOD FOR TRANSMITTING AND RECEIVING PHYSICAL UPLINK CONTROL CHANNEL IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Hanjun Park, Seoul (KR); Duckhyun Bae, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 17/056,861

(22) PCT Filed: Jul. 31, 2019

(86) PCT No.: PCT/KR2019/009555
§ 371 (c)(1),
(2) Date: Nov. 19, 2020

(87) PCT Pub. No.: WO2020/027579
PCT Pub. Date: Feb. 6, 2020

(65) Prior Publication Data
US 2021/0266893 A1    Aug. 26, 2021

Related U.S. Application Data

(60) Provisional application No. 62/712,930, filed on Jul. 31, 2018.

(51) Int. Cl.
*H04L 1/1812* (2023.01)
*H04W 72/21* (2023.01)
*H04W 72/23* (2023.01)

(52) U.S. Cl.
CPC .......... *H04W 72/21* (2023.01); *H04L 1/1812* (2013.01); *H04W 72/23* (2023.01)

(58) Field of Classification Search
CPC .......... H04W 72/0413; H04W 72/042; H04W 72/0446; H04W 72/21; H04W 72/23;
(Continued)

(56) References Cited

U.S. PATENT DOCUMENTS 9,179,458 B2 * 11/2015 Park ...................... H04L 1/1861
10,560,174 B2 * 2/2020 He .......................... H04L 1/1812
(Continued)

FOREIGN PATENT DOCUMENTS

WO    WO2014018984    1/2014

OTHER PUBLICATIONS

MediaTek Inc., "Remaining issues in carrier aggregation," R1-1806776, 3GPP TSG RAN WG1 Meeting #93, Busan, Korea, May 21-25, 2018, 12 pages.
(Continued)

*Primary Examiner* — Hanh N Nguyen
(74) *Attorney, Agent, or Firm* — Fish & Richardson P.C.

(57) ABSTRACT

A method of transmitting a physical uplink control channel (PUCCH) in a wireless communication system and a device therefor are disclosed. Specifically, the method performed by a user equipment (UE) includes receiving, from a base station (BS), configuration information for performing transmission and reception on a per subslot basis, receiving, from the BS, multiple physical downlink shared channels (PDSCHs) based on the configuration information, and transmitting, to the BS, the PUCCH including hybrid automatic repeat request (HARQ)-acknowledgement (ACK) information for the multiple PDSCHs in a specific slot. The PUCCH includes a first PUCCH transmitted in a first subslot of the specific slot and a second PUCCH transmitted in a second
(Continued)

subslot of the specific slot. The first PUCCH and the second PUCCH each are transmitted based on a separately constructed HARQ-ACK codebook.

3 Claims, 14 Drawing Sheets

(58) Field of Classification Search
CPC ... H04L 1/1812; H04L 1/1861; H04L 1/1864; H04L 1/1854; H04L 5/00; H04L 5/0053; H04L 5/0044; H04L 5/0094; H04L 5/094
See application file for complete search history.

(56) References Cited

U.S. PATENT DOCUMENTS

| 11,101,943 | B2* | 8/2021 | Fu | H04W 72/0406 |
| 2018/0019843 | A1* | 1/2018 | Papasakellariou | H04L 1/1861 |
| 2019/0103943 | A1* | 4/2019 | Wang | H04L 1/1854 |
| 2020/0052831 | A1* | 2/2020 | Yang | H04L 1/1614 |
| 2020/0228248 | A1* | 7/2020 | Islam | H04L 1/1861 |
| 2020/0396029 | A1* | 12/2020 | Baldemair | H04L 5/0055 |

OTHER PUBLICATIONS

NTT Docomo, Inc., "UL data transmission procedure for June Release URLLC," R1-1807069, 3GPP TSG RAN WG1 Meeting #93, Busan, Korea, May 21-25, 2018, 6 pages.

Oppo, "Aspects related to collision handling for subslot—PUSCH," R1-1806857, 3GPP TSG RAN WG1 Meeting #93, Busan, Korea, May 21-25, 2018, 6 pages.

PCT International Search Report in International Appln. PCT/KR2019/009555, dated Feb. 12, 2019, 7 pages (with English translation).

Qualcomm Incorporated, "Aspects related to interaction between different TTI lengths," R1-1802308, 3GPP TSG RAN WG1 #92, Feb. 26-Mar. 2, 2018, Athens, Greece, 7 pages.

* cited by examiner

[FIG. 1]
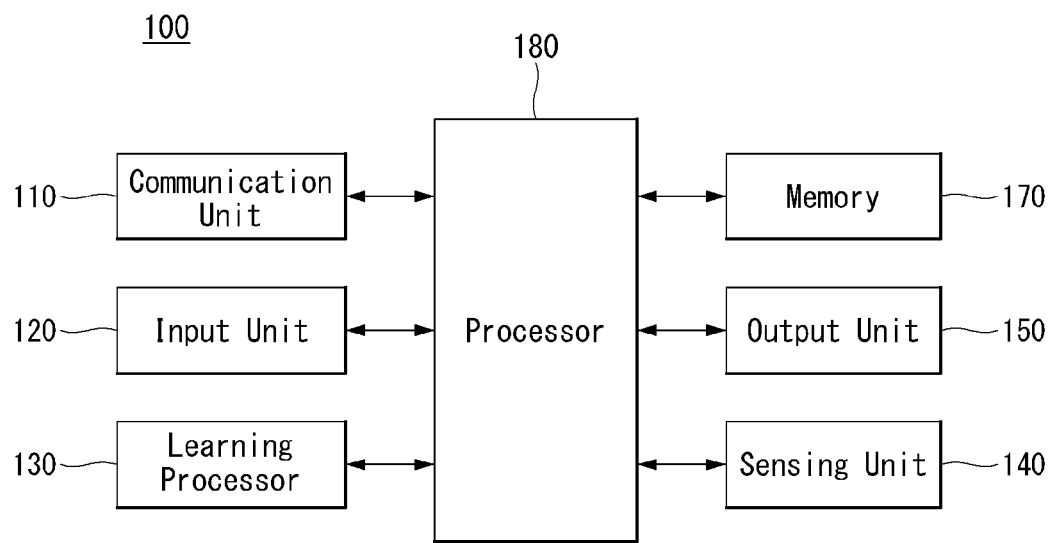
[FIG. 2]
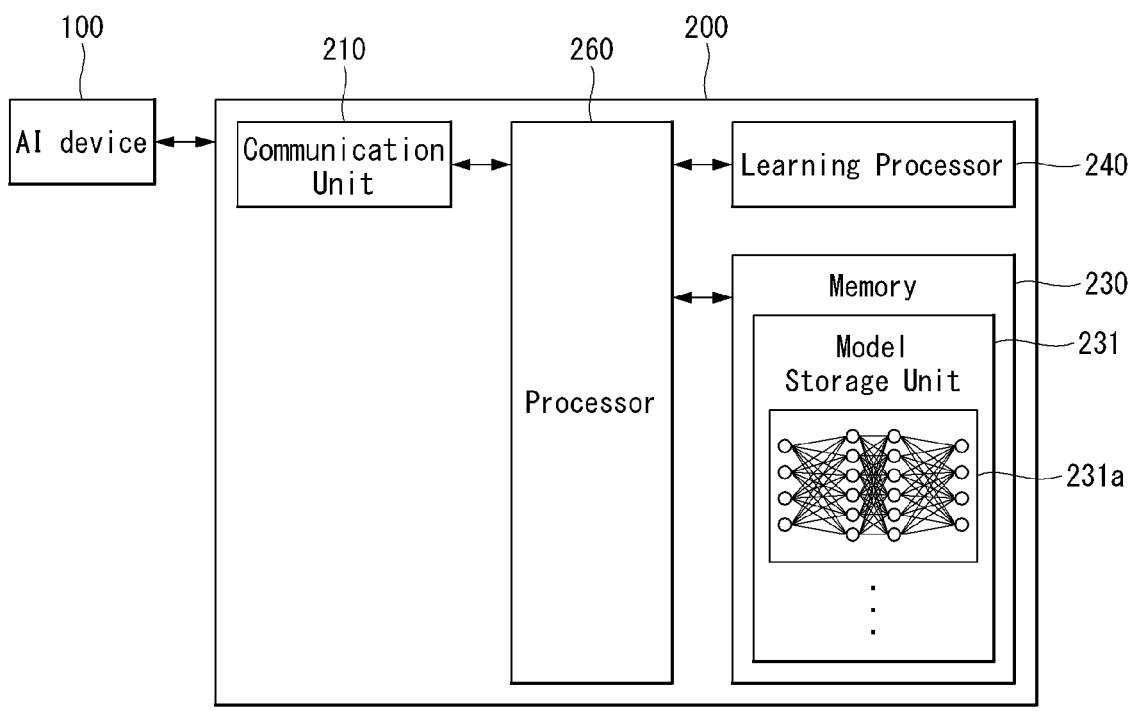

[FIG. 3]
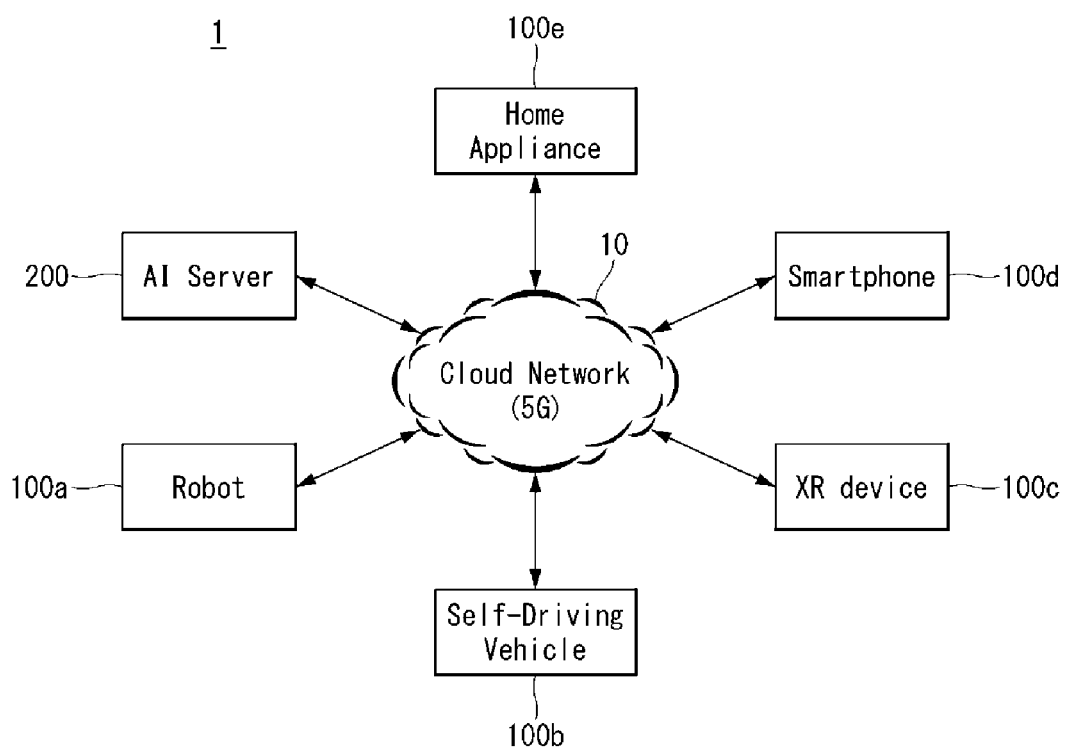

[FIG. 4]
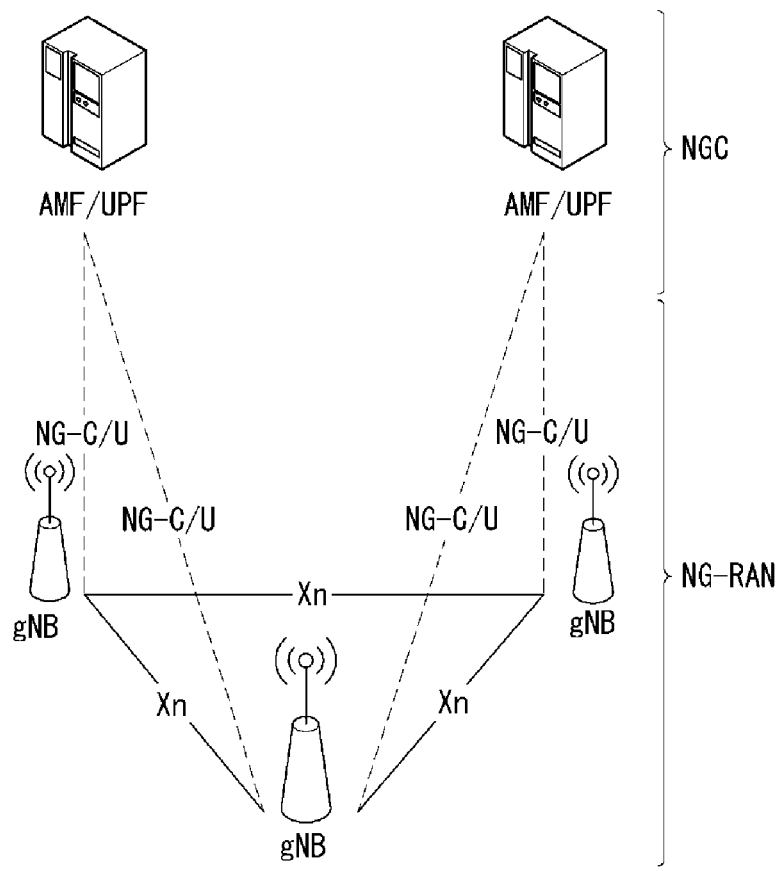
[FIG. 5]
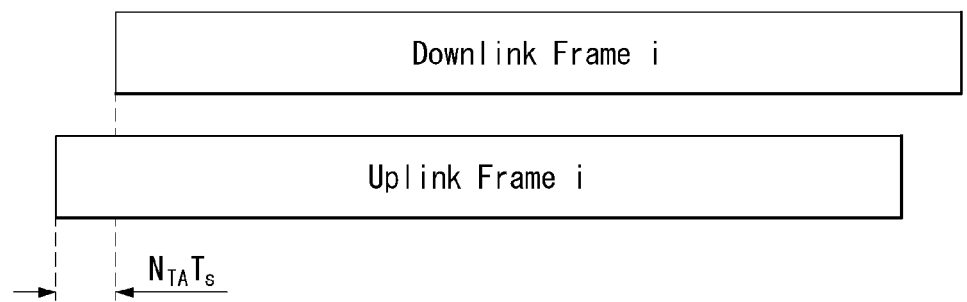

[FIG. 6]
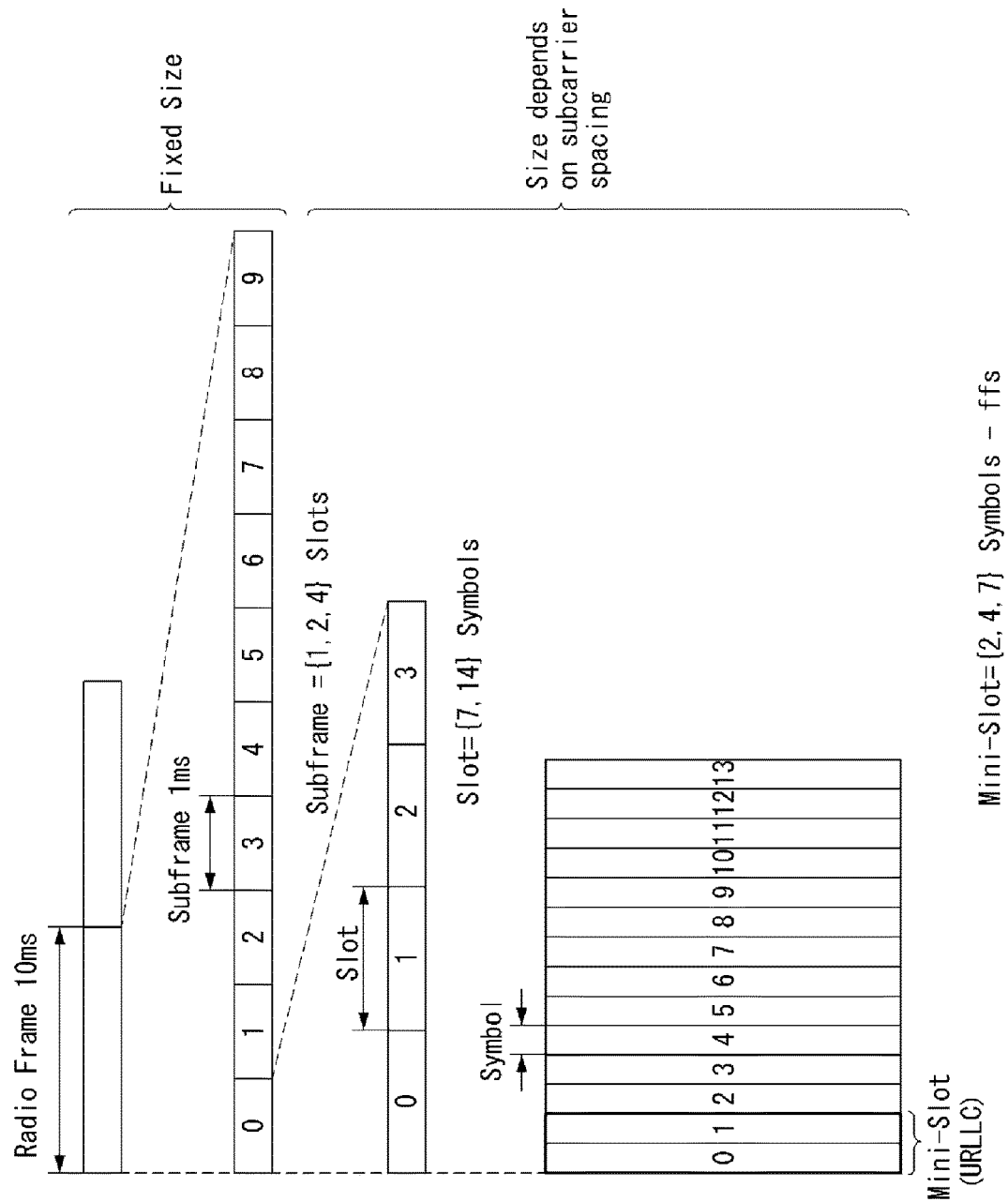

[FIG. 7]
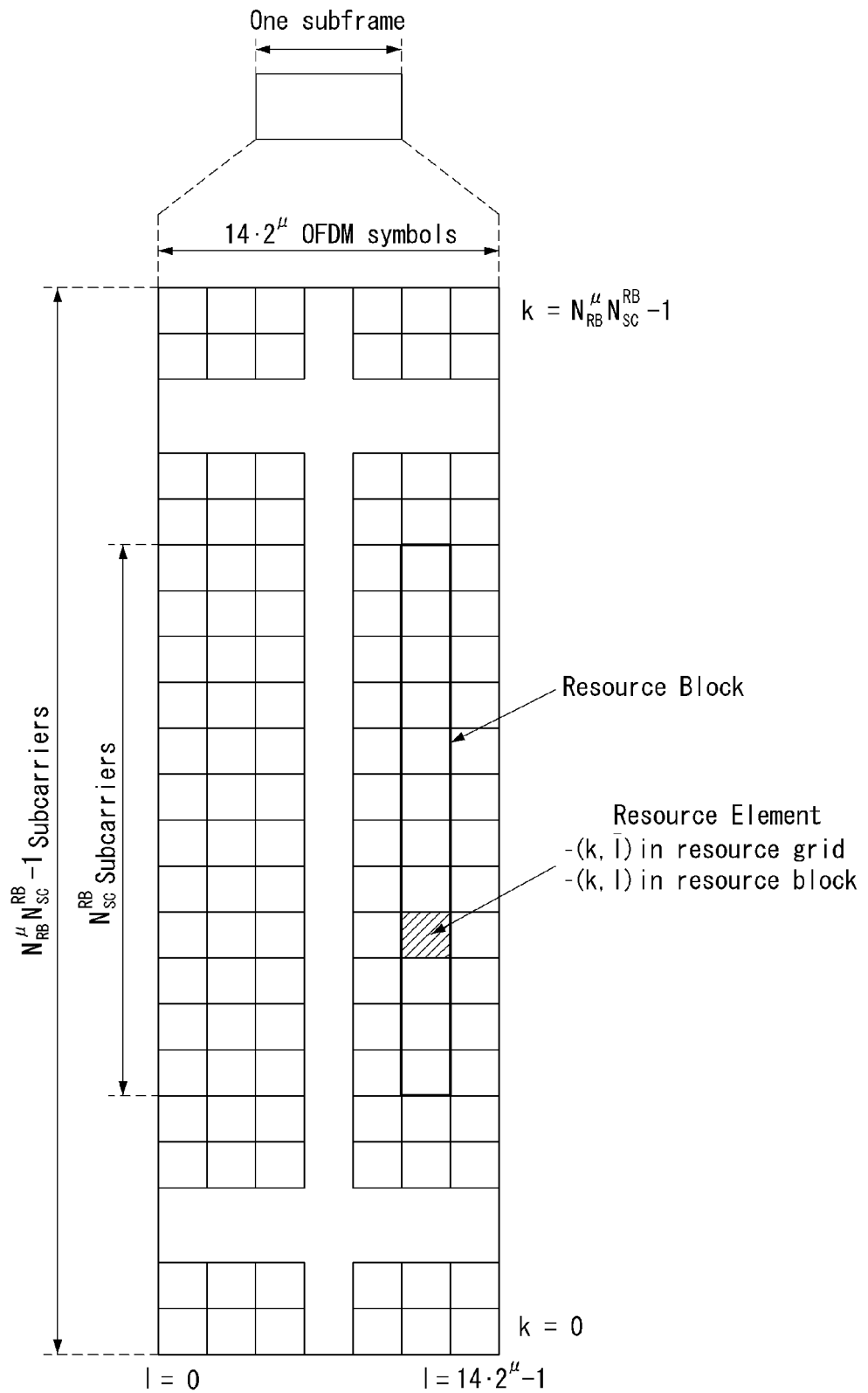

[FIG. 8]
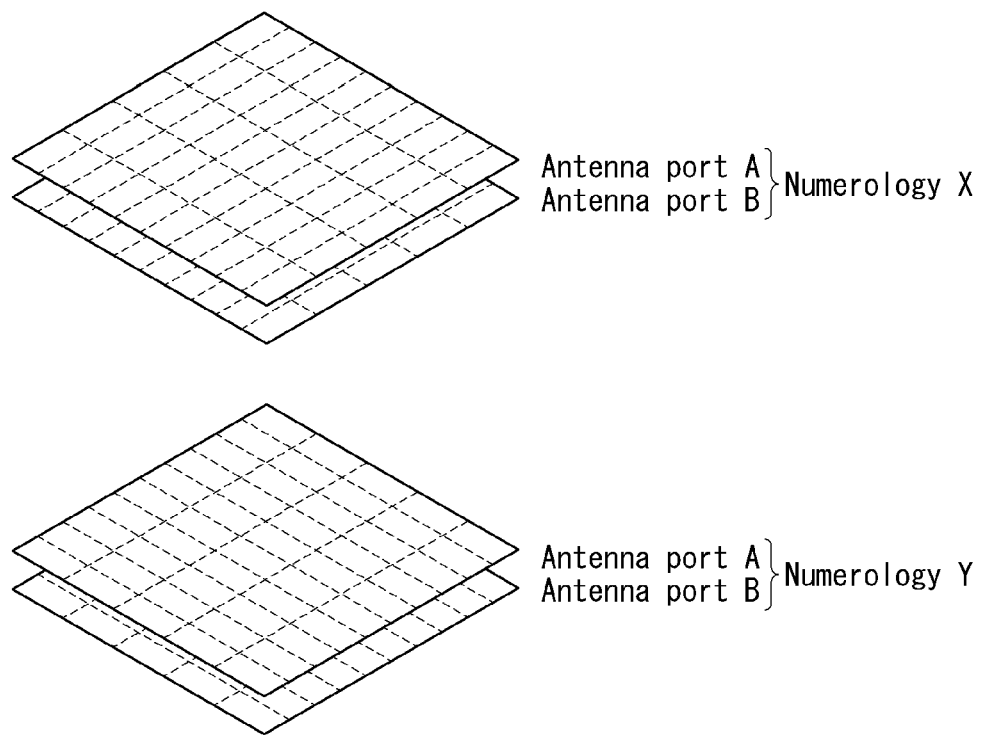

[FIG. 9]
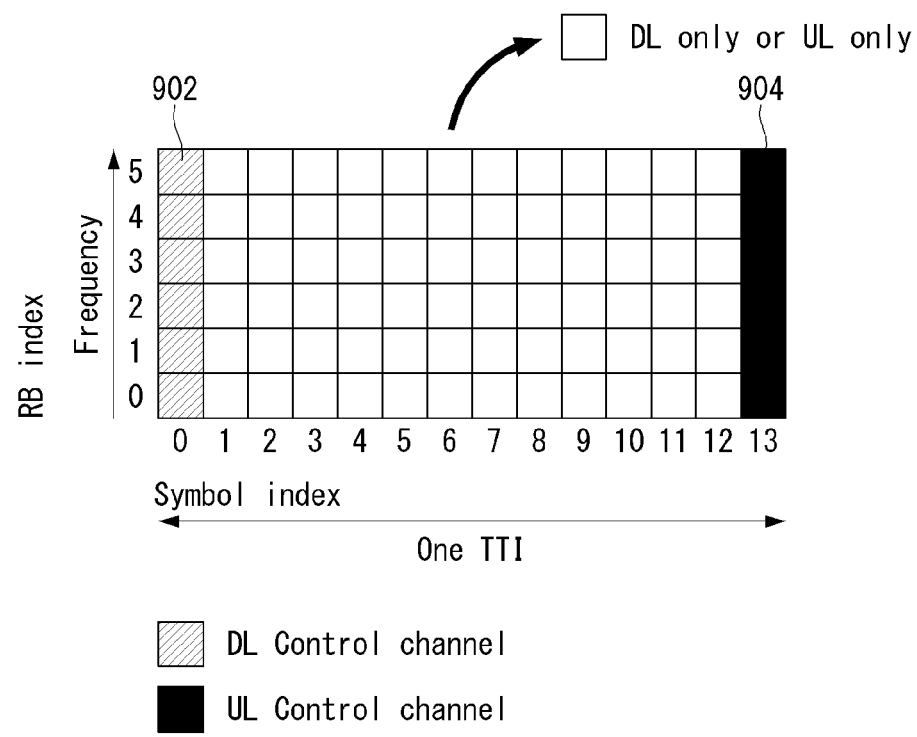

[FIG. 10]
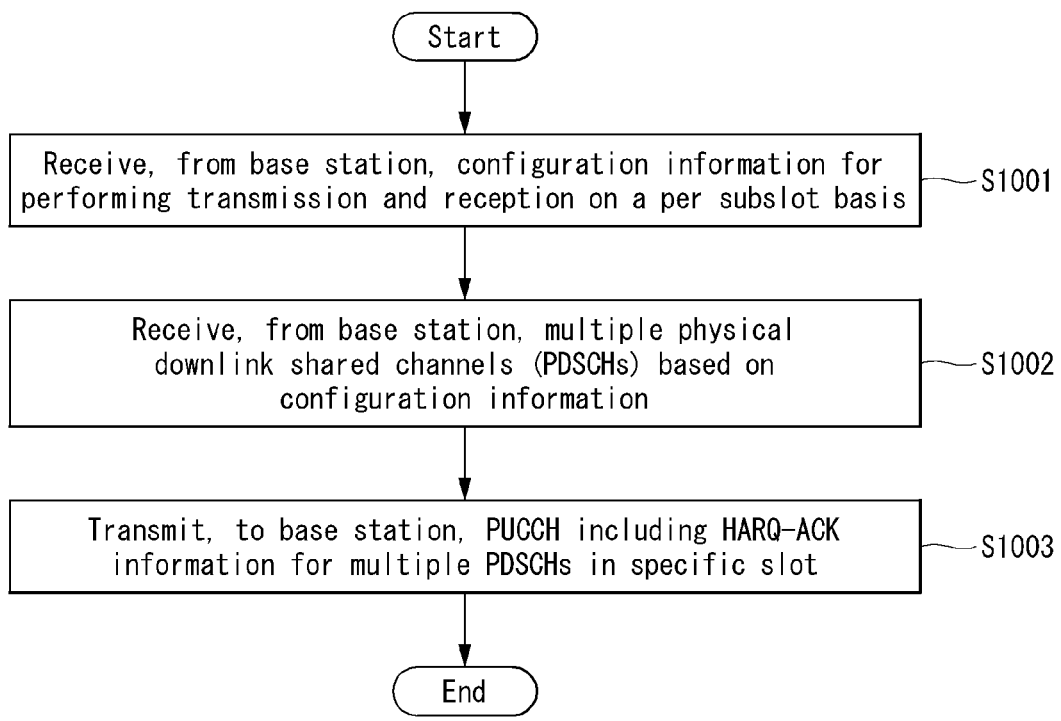

[FIG. 11]
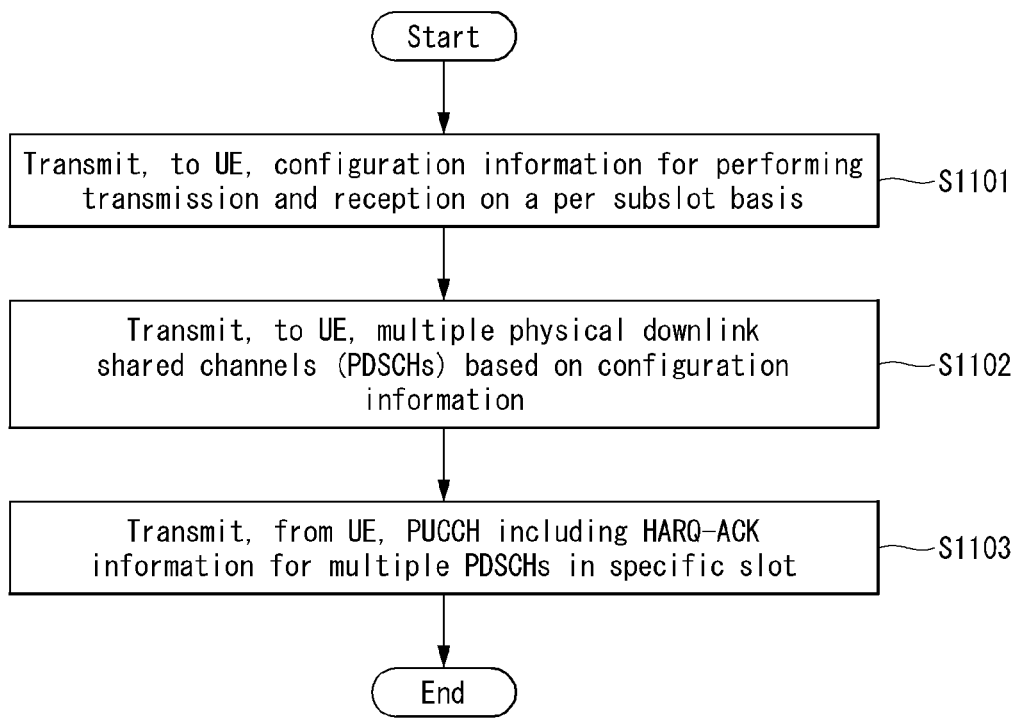

[FIG. 12]
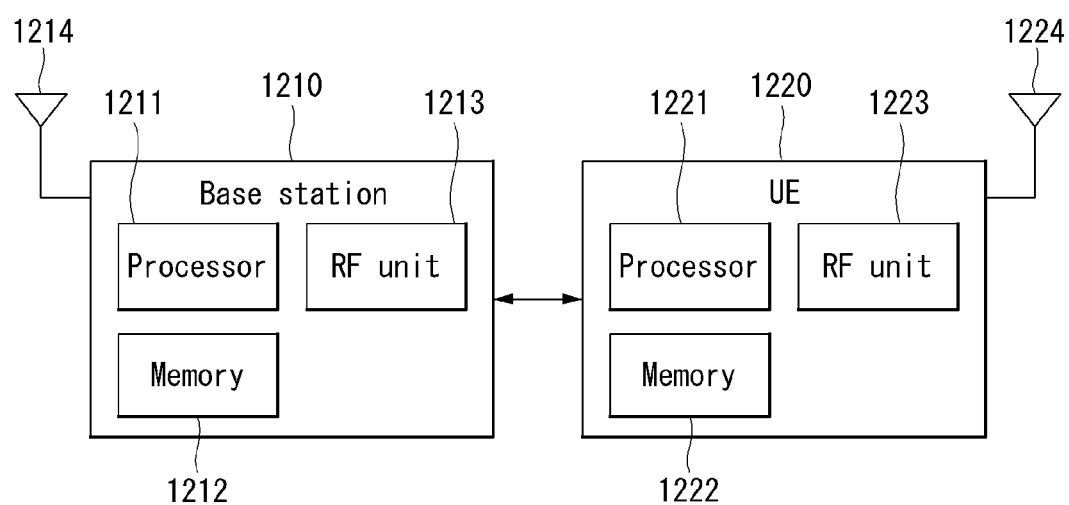

[FIG. 13]
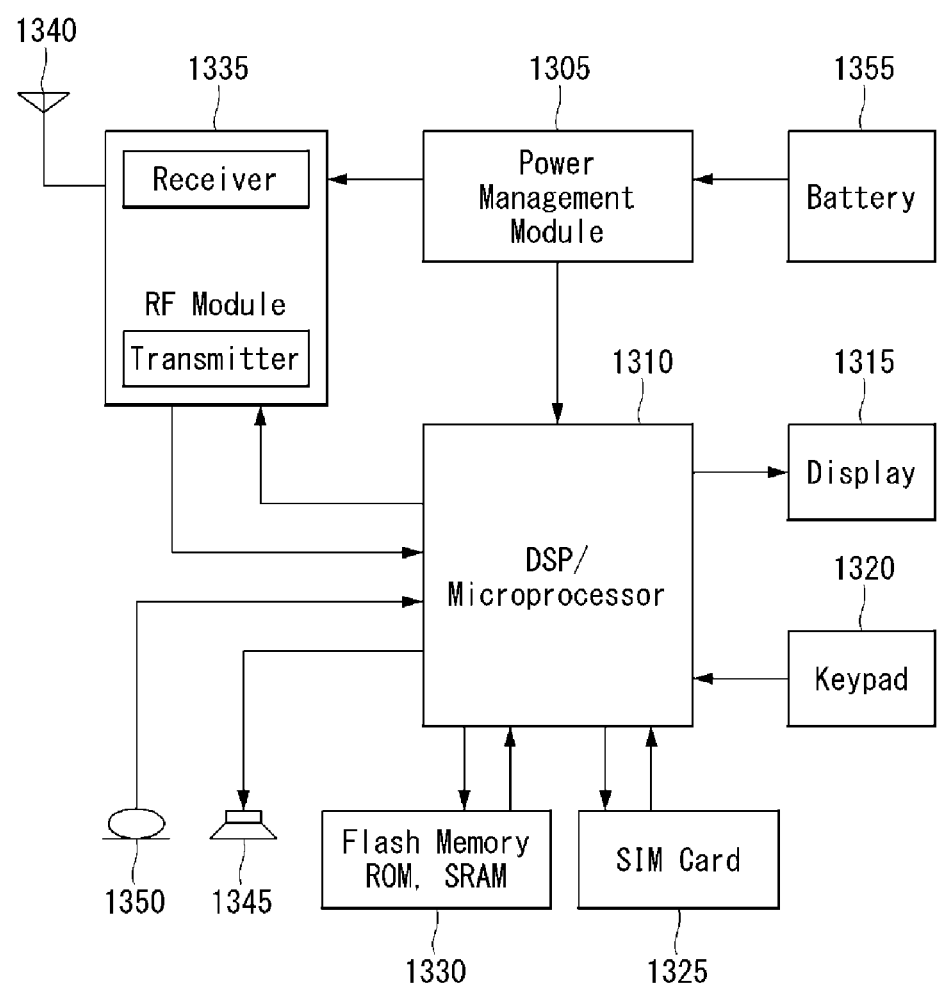

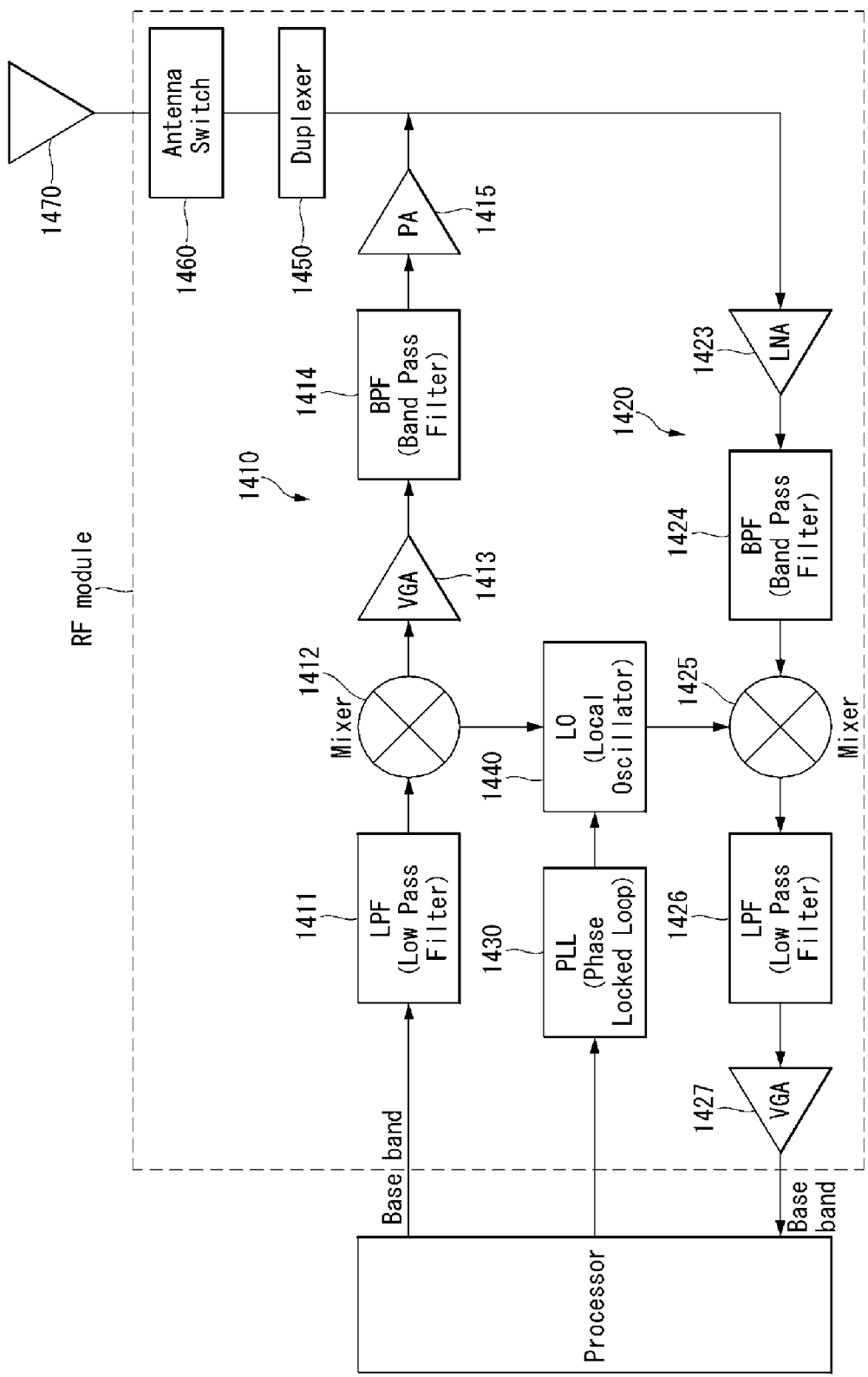
[FIG. 14]

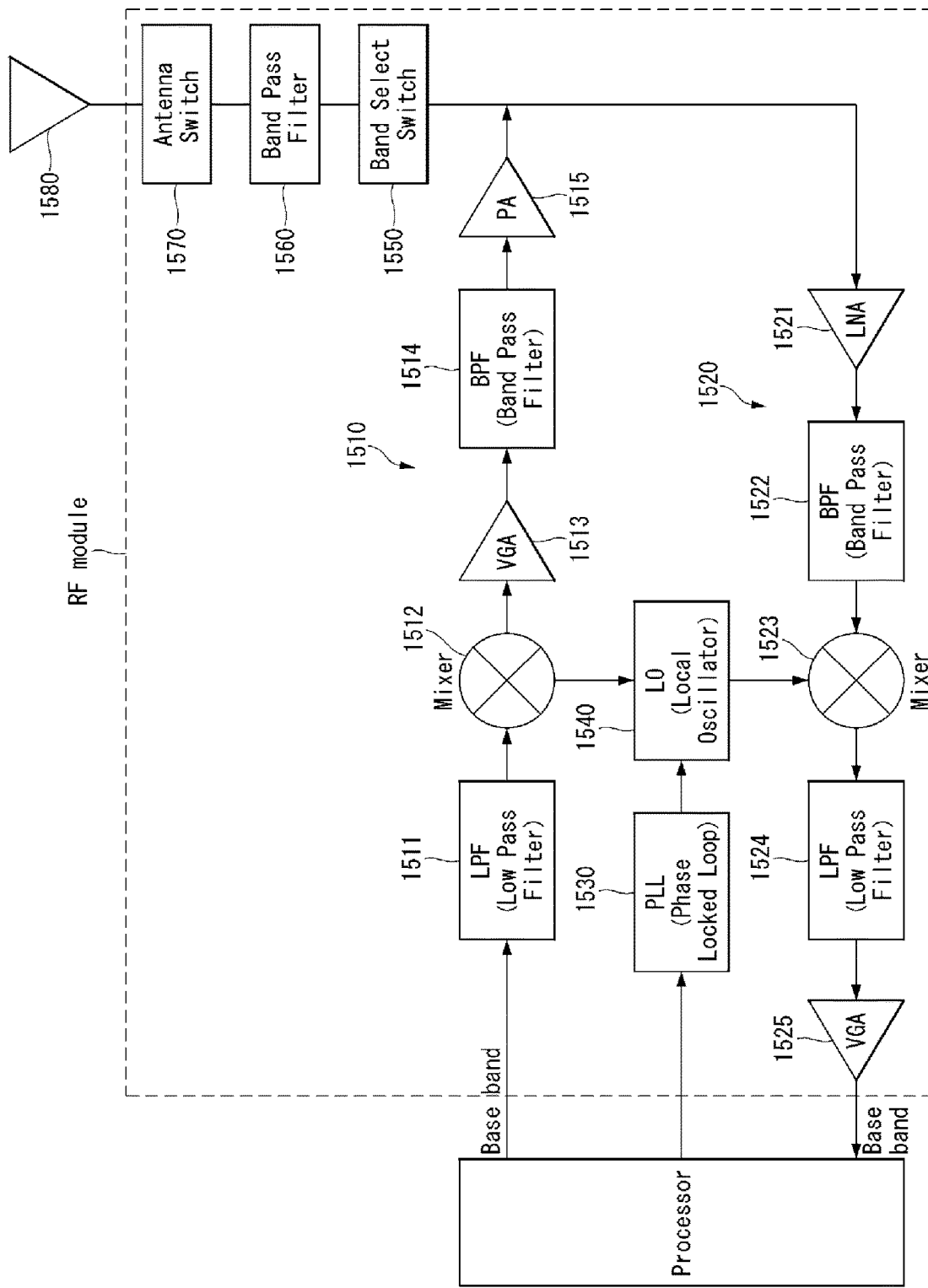
[FIG. 15]

[FIG. 16]
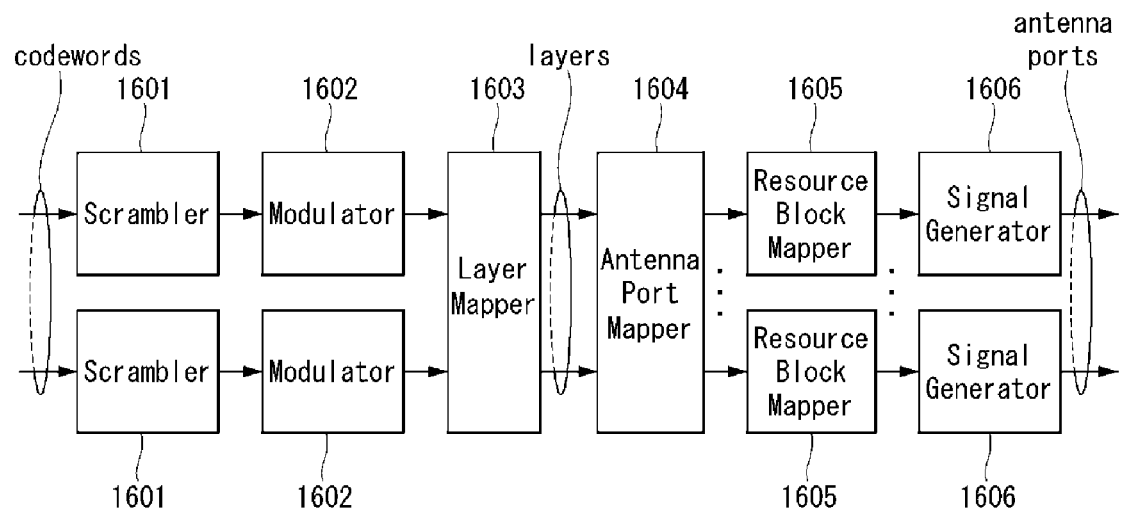
[FIG. 17]
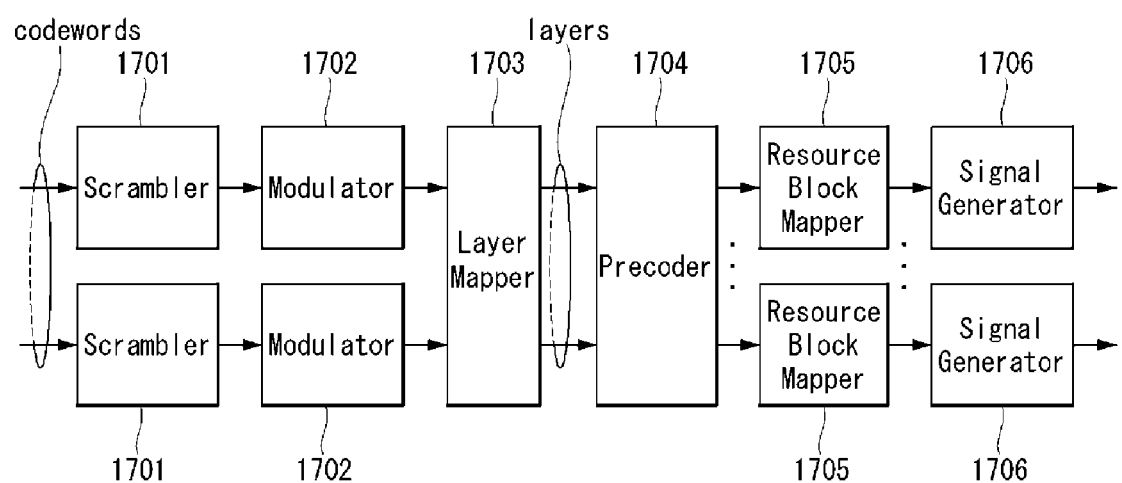

METHOD FOR TRANSMITTING AND RECEIVING PHYSICAL UPLINK CONTROL CHANNEL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/009555, filed on Jul. 31, 2019, which claims the benefit of U.S. Provisional Application No. 62/712,930, filed on Jul. 31, 2018, the contents of which are all hereby incorporated by reference herein in their entirety.

TECHNICAL FIELD

The present disclosure relates to a wireless communication system, and more particularly to a method of transmitting and receiving a physical uplink control channel (PUCCH) including hybrid automatic repeat request (HARQ)-acknowledgement (ACK) information and a device supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method of transmitting and receiving HARQ-ACK information on a plurality of PUCCHs in one slot.

More specifically, the present disclosure proposes a method of transmitting and receiving HARQ-ACK for a physical downlink shared channel (PDSCH) via a PUCCH of each subslot by configuring a slot on a per subslot basis.

Technical problems to be solved by the present disclosure are not limited by the above-mentioned technical problems, and other technical problems which are not mentioned above can be clearly understood from the following description by those skilled in the art to which the present disclosure pertains.

Technical Solution

The present disclosure proposes a method of transmitting a physical uplink control channel (PUCCH) in a wireless communication system. One general aspect of the present disclosure comprises a method performed by a user equipment (UE) comprising receiving, from a base station (BS), configuration information for performing transmission and reception on a per subslot basis, receiving, from the BS, multiple physical downlink shared channels (PDSCHs) based on the configuration information, and transmitting, to the BS, the PUCCH including hybrid automatic repeat request (HARQ)-acknowledgement (ACK) information for the multiple PDSCHs in a specific slot, wherein the PUCCH includes a first PUCCH transmitted in a first subslot of the specific slot and a second PUCCH transmitted in a second subslot of the specific slot, wherein the first PUCCH and the second PUCCH each are transmitted based on a separately constructed HARQ-ACK codebook.

In the method of the present disclosure, the multiple PDSCHs may include first PDSCHs in which a subslot for HARQ-ACK transmission is indicated as the first subslot, and second PDSCHs in which the subslot for HARQ-ACK transmission is indicated as the second subslot. HARQ-ACK information for the first PDSCHs may be included in the first PUCCH, and HARQ-ACK information for the second PDSCHs is included in the second PUCCH.

In the method of the present disclosure, the method may further comprise receiving, from the BS, a physical downlink control channel (PDCCH) including a PUCCH resource indicator. The PUCCH resource indicator may be interworked with the first PUCCH and the second PUCCH. The HARQ-ACK information for the first PDSCHs may be determined to be transmitted via the first PUCCH among resources interworked with the PUCCH resource indicator based on a processing time of the first PDSCHs. The HARQ-ACK information for the second PDSCHs may be determined to be transmitted via the second PUCCH among the resources interworked with the PUCCH resource indicator based on a processing time of the second PDSCHs.

In the method of the present disclosure, the method may further comprise receiving, from the BS, PUCCH resource configuration information including a plurality of starting symbols and a length. The HARQ-ACK information for the first PDSCHs may be determined to be transmitted via the first PUCCH by a first starting symbol and the length among the plurality of starting symbols and the length based on a processing time of the first PDSCHs. The HARQ-ACK information for the second PDSCHs may be determined to be transmitted via the second PUCCH by a second starting symbol and the length among the plurality of starting symbols and the length based on a processing time of the second PDSCHs.

In the method of the present disclosure, the configuration information may include information for a number of subslots included in a slot.

Another general aspect of the present disclosure comprises a user equipment (UE) transmitting a physical uplink control channel (PUCCH) in a wireless communication system, the UE comprising a radio frequency (RF) unit configured to transmit and receive a radio signal, and a processor functionally connected to the RF unit, wherein the processor is configured to receive, from a base station (BS), configuration information for performing transmission and reception on a per subslot basis; receive, from the BS, multiple physical downlink shared channels (PDSCHs) based on the configuration information; and transmit, to the BS, the PUCCH including hybrid automatic repeat request (HARQ)-acknowledgement (ACK) information for the multiple PDSCHs in a specific slot, wherein the PUCCH includes a first PUCCH transmitted in a first subslot of the specific slot and a second PUCCH transmitted in a second subslot of the specific slot, wherein the first PUCCH and the second PUCCH each are transmitted based on a separately constructed HARQ-ACK codebook.

In the UE of the present disclosure, the multiple PDSCHs may include first PDSCHs in which a subslot for HARQ-ACK transmission is indicated as the first subslot, and second PDSCHs in which the subslot for HARQ-ACK transmission is indicated as the second subslot. HARQ-ACK information for the first PDSCHs may be included in the first PUCCH, and HARQ-ACK information for the second PDSCHs may be included in the second PUCCH.

In the UE of the present disclosure, the processor may be configured to receive, from the BS, a physical downlink control channel (PDCCH) including a PUCCH resource indicator. The PUCCH resource indicator may be interworked with the first PUCCH and the second PUCCH. The HARQ-ACK information for the first PDSCHs may be determined to be transmitted via the first PUCCH among resources interworked with the PUCCH resource indicator based on a processing time of the first PDSCHs. The HARQ-ACK information for the second PDSCHs may be determined to be transmitted via the second PUCCH among the resources interworked with the PUCCH resource indicator based on a processing time of the second PDSCHs.

In the UE of the present disclosure, the processor may be configured to receive, from the BS, PUCCH resource configuration information including a plurality of starting symbols and a length. The HARQ-ACK information for the first PDSCHs may be determined to be transmitted via the first PUCCH by a first starting symbol and the length among the plurality of starting symbols and the length based on a processing time of the first PDSCHs. The HARQ-ACK information for the second PDSCHs may be determined to be transmitted via the second PUCCH by a second starting symbol and the length among the plurality of starting symbols and the length based on a processing time of the second PDSCHs.

In the UE of the present disclosure, the configuration information may include information for a number of subslots included in a slot.

Another general aspect of the present disclosure comprises a base station (BS) receiving a physical uplink control channel (PUCCH) in a wireless communication system, the BS comprising a radio frequency (RF) unit configured to transmit and receive a radio signal, and a processor functionally connected to the RF unit, wherein the processor is configured to transmit, to a user equipment (UE), configuration information for performing transmission and reception on a per subslot basis, transmit, to the UE, multiple physical downlink shared channels (PDSCHs) based on the configuration information, and receive, from the UE, the PUCCH including hybrid automatic repeat request (HARQ)-acknowledgement (ACK) information for the multiple PDSCHs in a specific slot, wherein the PUCCH includes a first PUCCH transmitted in a first subslot of the specific slot and a second PUCCH transmitted in a second subslot of the specific slot, wherein the first PUCCH and the second PUCCH each are received based on a separately constructed HARQ-ACK codebook.

In the BS of the present disclosure, the multiple PDSCHs may include first PDSCHs in which a subslot for HARQ-ACK transmission is indicated as the first subslot, and second PDSCHs in which the subslot for HARQ-ACK transmission is indicated as the second subslot. HARQ-ACK information for the first PDSCHs may be included in the first PUCCH, and HARQ-ACK information for the second PDSCHs may be included in the second PUCCH.

In the BS of the present disclosure, the processor may be configured to transmit, to the UE, a physical downlink control channel (PDCCH) including a PUCCH resource indicator. The PUCCH resource indicator may be interworked with the first PUCCH and the second PUCCH. The HARQ-ACK information for the first PDSCHs may be determined to be transmitted via the first PUCCH among resources interworked with the PUCCH resource indicator based on a processing time of the first PDSCHs. The HARQ-ACK information for the second PDSCHs may be determined to be transmitted via the second PUCCH among the resources interworked with the PUCCH resource indicator based on a processing time of the second PDSCHs.

In the BS of the present disclosure, the processor may be configured to transmit, to the UE, PUCCH resource configuration information including a plurality of starting symbols and a length. The HARQ-ACK information for the first PDSCHs may be determined to be transmitted via the first PUCCH by a first starting symbol and the length among the plurality of starting symbols and the length based on a processing time of the first PDSCHs. The HARQ-ACK information for the second PDSCHs may be determined to be transmitted via the second PUCCH by a second starting symbol and the length among the plurality of starting symbols and the length based on a processing time of the second PDSCHs.

In the BS of the present disclosure, the configuration information includes information for a number of subslots included in a slot.

Advantageous Effects

Embodiments of the present disclosure can implement a low latency and ultra reliable communication system by transmitting and receiving a subslot-based HARQ-ACK feedback via a plurality of PUCCHs in one slot.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram showing an AI device to which a method proposed in the present disclosure is applicable.

FIG. 2 is a diagram showing an AI server to which a method proposed in the present disclosure is applicable.

FIG. 3 is a diagram showing an AI system to which a method proposed in the present disclosure is applicable.

FIG. 4 illustrates an example of an overall structure of a NR system to which a method proposed in the present disclosure is applicable.

FIG. 5 illustrates a relation between an uplink frame and a downlink frame in a wireless communication system to which a method proposed in the present disclosure is applicable.

FIG. 6 illustrates an example of a frame structure in a NR system.

FIG. 7 illustrates an example of a resource grid supported in a wireless communication system to which a method proposed in the present disclosure is applicable.

FIG. 8 illustrates examples of a resource grid per antenna port and numerology to which a method proposed in the present disclosure is applicable.

FIG. 9 illustrates an example of a self-contained structure to which a method proposed in the present disclosure is applicable.

FIG. 10 is a flow chart illustrating an operation method of a UE proposed in the present disclosure.

FIG. 11 is a flow chart illustrating an operation method of a base station proposed in the present disclosure.

FIG. 12 illustrates a block configuration diagram of a wireless communication device to which methods proposed in the present disclosure are applicable.

FIG. 13 illustrates a block configuration diagram of a communication device according to an embodiment of the present disclosure.

FIG. 14 illustrates an example of a RF module of a wireless communication device to which a method proposed in the present disclosure is applicable.

FIG. 15 illustrates another example of a RF module of a wireless communication device to which a method proposed in the present disclosure is applicable.

FIG. 16 illustrates an example of a signal processing module to which methods proposed in the present disclosure are applicable.

FIG. 17 illustrates another example of a signal processing module to which methods proposed in the present disclosure are applicable.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

Hereinafter, examples of 5G use scenarios to which a method proposed in the present disclosure is applicable are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method proposed in the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method proposed in the present disclosure is applicable.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 3 may be considered to be detailed embodiments of the AI device 100 shown in FIG. 1.

AI+Robot

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As smart phones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation radio access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the present disclosure, for convenience of explanation, the next generation radio access technology is referred to as NR (new RAT, radio access technology), and a wireless communication system to which the NR is applied is referred to as an NR system.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of a NR system to which a method proposed in the present disclosure is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an $X_n$ interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

FIG. 5 illustrates a relation between an uplink frame and a downlink frame in a wireless communication system to which a method proposed in the present disclosure is applicable.

As illustrated in FIG. 5, uplink frame number i for transmission from a user equipment (UE) shall start $T_{TA} = N_{TA} T_s$ before the start of a corresponding downlink frame at the corresponding UE.

Regarding the numerology $\mu$, slots are numbered in increasing order of $n_s^\mu \in \{0, \ldots, N_{subframe}^{slots, \mu} - 1\}$ within a subframe and are numbered in increasing order of $n_{s,f}^\mu \in \{0, \ldots, N_{frame}^{slots, \mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ OFDM symbols per slot, the number $N_{slot}^{frame, \mu}$ of slots per radio frame, and the number $N_{slot}^{subframe, \mu}$ of slots per subframe in a normal CP. Table 3 represents the number of OFDM symbols per slot, the number of slots per radio frame, and the number of slots per subframe in an extended CP.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 6 illustrates an example of a frame structure in a NR system. FIG. 6 is merely for convenience of explanation and does not limit the scope of the present disclosure.

In Table 3, in case of $\mu=2$, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 7 illustrates an example of a resource grid supported in a wireless communication system to which a method proposed in the present disclosure is applicable.

Referring to FIG. 7, a resource grid consists of $N_{RB}^\mu N_{sc}^{RB}$ subcarriers on a frequency domain, each subframe consisting of 14·2 μOFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $NR_{RB}^{max, \mu}$ denotes a maximum transmission bandwidth and may change not only between numerologies but also between uplink and downlink.

In this case, as illustrated in FIG. 8, one resource grid may be configured per numerology $\mu$ and antenna port p.

FIG. 8 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,l), where k=0, ..., $N_{RB}^\mu N_{sc}^{RB} - 1$ is an index on a frequency domain, and l=0, ..., $2^\mu N_{symb}^{(\mu)} - 1$ refers to a location of a symbol in a subframe. The index pair (k,l) is used to refer to a resource element in a slot, where l=0, ..., $N_{symb}^\mu - 1$.

The resource element (k,l) for the numerology $\mu$ and the antenna port p corresponds to a complex value $\alpha_{k,l}^{(p, \mu)}$. When there is no risk for confusion or when a specific antenna port or numerology is not specified, the indexes p and N may be dropped, and as a result, the complex value may be $\alpha_{k,l}^{(p)}$ or $\alpha_{k, l}$.

Further, a physical resource block is defined as $N_{sc}^{RB} = 12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor$$ [Equation 1]

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start}$$ [Equation 2]

Here, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 9 illustrates an example of a self-contained structure to which a method proposed in the present disclosure is applicable. FIG. 9 is merely for convenience of explanation and does not limit the scope of the present disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In regard to the time gap, if uplink transmission is performed after downlink transmission in the self-contained slot, some OFDM symbol(s) may be configured as a guard period (GP).

Bandwidth Par

A bandwidth part (BWP) may be a contiguous subset of common resource blocks for a given numerology u_i at BWP i on a given carrier. A starting position $N_{BWP,i}^{start,\mu}$ and the number of resource blocks $N_{BWP,i}^{size,\mu}$ in the bandwidth part each may have to fulfill $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$. The configuration of the BWP may be specified in a predefined standard (e.g., clause 12 of 3GPP TS 38.213).

A UE can be configured with up to four BWPs in the downlink with a single downlink BWP being active at a given time. The UE may not be expected to receive PDSCH, PDCCH or CSI-RS (excluding RRM) outside an active BWP.

A UE can be configured with up to four BWPs in the uplink with a single uplink BWP being active at a given time. If the UE is configured with a supplementary uplink, the UE can in addition be configured with up to four bandwidth parts in the supplementary uplink with a single supplementary uplink BWP being active at a given time. The UE may not have to transmit PUSCH or PUCCH outside an active BWP. For an active cell, the UE may not have to transmit SRS outside an active BWP.

Unless otherwise described, the description in the present disclosure can be applied to each of the BWPs.

In addition, transmissions in a plurality of cells can be aggregated. Unless otherwise described, the description in the present disclosure can be applied to each of serving cells.

Bandwidth Part Operation

If a UE is configured with a SCG, the UE may apply the procedures according to a predefined standard for MCG and SCG (e.g., 3GPP TS 38.213).

When the corresponding procedures are applied for MCG, the terms 'secondary cell', 'secondary cells', 'serving cell' and 'serving cells' in the predefined standard (e.g., 3GPP TS 38.213) refer to secondary cell, secondary cells, serving cell and serving cells belonging to the MCG, respectively.

When the corresponding procedures are applied for SCG, the terms 'secondary cell', 'secondary cells', 'serving cell' and 'serving cells' in clause of the predefined standard refer to secondary cell, secondary cells not including PSCell, serving cell and serving cells belonging to the SCG, respectively. The term 'primary cell' in the predefined standard (e.g., 3GPP TS 38.213) refers to the PSCell of the SCG.

The UE configured for operation in bandwidth parts (BWPs) of a serving cell may be configured for the serving cell with a set of at most four bandwidth parts (BWPs) for receptions by the UE (DL BWP set) in a DL bandwidth and a set of at most four BWPs for transmissions by the UE (UL BWP set) in an UL bandwidth by parameter UL-BWP.

An initial active DL BWP may be defined by a location and number of contiguous PRBs, a subcarrier spacing, and a cyclic prefix, for the control resource set for Type0-PDCCH common search space. For operation on the primary cell, a UE may be provided with an initial UL BWP by higher layer parameter initial-UL-BWP. If the UE is configured with a secondary carrier on the primary cell, the UE may be configured with an initial BWP for a random access procedure on the secondary carrier.

If a UE has a dedicated BWP configuration, the UE can be provided with a first active DL BWP for receptions on the primary cell by higher layer parameter Active-BWP-DL-Pcell and a first active UL BWP for transmissions on the primary cell by higher layer parameter Active-BWP-UL-Pcell.

For each DL BWP or UL BWP in a set of DL BWPs or UL BWPs, respectively, the UE may be configured with the following parameters for the serving cell as defined in a predefined standard (e.g., 3GPP TS 38.211 or 3GPP TS 38.214).

A subcarrier spacing provided by higher layer parameter DL-BWP-mu or UL-BWP-mu;

A cyclic prefix provided by higher layer parameter DL-BWP-CP or UL-BWP-CP;

A number of contiguous PRBs provided by higher layer parameter DL-BWP-BW or UL-BWP-BW, and a PRB offset for a PRB determined by higher layer parameter offset-pointA-low-scs and ref-sc;

n indexes in a set of DL BWPs or UL BWPs by respective higher layer parameters DL-BWP-index or UL-BWP-index;

A DCI format 1_0 or DCI format 1_1 detection to a PDSCH reception timing value by higher layer parameter DL-data-time-domain, a PDSCH reception to a HARQ-ACK transmission timing value by higher layer parameter DL-data-DL-acknowledgement, and a DCI 0_0 or DCI 0_1 detection to a PUSCH transmission timing value by higher layer parameter UL-data-time-domain;

For an unpaired spectrum operation, when the DL-BWP-index and the UL-BWP-index are equal, a DL BWP from a set of configured DL BWPs with an index provided by higher layer parameter DL-BWP-index may be paired with a UL BWP from a set of configured UL BWPs with an index provided by higher layer parameter UL-BWP-index. For the unpaired spectrum operation, when a DL-BWP-index of a DL BWP is equal to a UL-BWP-index of a UL BWP, the UE may not expect to receive a configuration where a center frequency for the DL BWP is different a center frequency for the UL BWP.

For each DL BWP in a set of DL BWPs on the primary cell, a UE can be configured with control resource sets for every type of common search space and for UE-specific search space as described in a predefined standard (e.g., 3GPP TS 38.213). The UE may not expect to be configured without a common search space on the PCell or on the PSCell, in the active DL BWP.

For each UL BWP in a set of UL BWPs, the UE can be configured with resource sets for PUCCH transmissions as described in a predefined standard (e.g., 3GPP TS 38.213).

A UE may receive PDCCH and PDSCH in a DL BWP according to a configured subcarrier spacing and a CP length for the DL BWP. The UE may transmit PUCCH and PUSCH in an UL BWP according to a configured subcarrier spacing and a CP length for the UL BWP.

If a bandwidth part indicator field is configured in DCI format 1_1, a bandwidth part indicator field value may indicate the active DL BWP, from the configured DL BWP set, for DL receptions. If a bandwidth part indicator field is configured in DCI format 0_1, a bandwidth part indicator field value may indicate the active UL BWP, from the configured UL BWP set, for UL transmissions.

If the bandwidth part indicator field is configured in DCI format 0_1 or DCI format 1_1 and indicates an UL BWP or a DL BWP different from the active UL BWP or DL BWP, respectively, the UE may have to operate as follows.

For each information field in the received DCI format 0_1 or DCI format 1_1, the UE may operate as follows.

If the size of the information field is smaller than the one required for the DCI format 0_1 or DCI format 1_1 interpretation for the UL BWP or DL BWP that is indicated by the bandwidth part indicator, respectively, the UE may have to prepend zeros to the information field until its size is the one required for the interpretation of the information field for the UL BWP or DL BWP prior to interpreting the DCI format 0_1 or DCI format 1_1 information fields, respectively.

If the size of the information field is larger than the one required for the DCI format 0_1 or DCI format 1_1 interpretation for the UL BWP or DL BWP that is indicated by the bandwidth part indicator, respectively, the UE may have to use a number of least significant bits of DCI format 0_1 or DCI format 1_1 equal to the one required for the UL BWP or DL BWP indicated by the bandwidth part indicator prior to interpreting the DCI format 0_1 or DCI format 1_1 information fields, respectively.

The UE may have to set the active UL BWP or DL BWP to the UL BWP or DL BWP indicated by the bandwidth part indicator in the DCI format 0_1 or DCI format 1_1, respectively.

Only if a corresponding PDCCH is received within the first 3 symbols of a slot, the UE may expect to detect a DCI format 01 indicating active UL BWP change or a DCI format 1_1 indicating active DL BWP change.

For the primary cell, a UE can be provided with a default DL BWP by higher layer parameter Default-DL-BWP among the configured DL BWPs. If a UE is not provided with a default DL BWP by higher layer parameter Default-DL-BWP, the default DL BWP is an initial active DL BWP.

If a UE is configured for a secondary cell with higher layer parameter Default-DL-BWP indicating a default DL BWP among the configured DL BWPs and is configured with higher layer parameter BWP-InactivityTimer indicating a timer value, the UE procedures on the secondary cell are same as that on the primary cell using the timer value for the secondary cell and the default DL BWP for the secondary cell.

If a UE is configured by higher layer parameter BWP-InactivityTimer a timer value for the primary cell and the timer is running, the UE increments the timer every interval of 1 millisecond for frequency range 1 or every 0.5 milliseconds for frequency range 2 if the UE does not detect DCI format 1_1 for paired spectrum operation or if the UE does not detect DCI format 1_1 or DCI format 0_1 for unpaired spectrum operation during an interval.

If a UE is configured by higher layer parameter Active-BWP-DL-SCell a first active DL BWP and by higher layer parameter Active-BWP-UL-SCell a first active UL BWP on a secondary cell or a carrier, the UE may use the indicated DL BWP and the indicated UL BWP on the secondary cell as the respective first active DL BWP and first active UL BWP on the secondary cell or the carrier.

For the paired spectrum operation, a UE is not expected to transmit HARQ-ACK on a PUCCH resource indicated by DCI format 1_0 or DCI format 1_1 if the UE changes its active UL BWP on the PCell between a time of a detection of the DCI format 1_0 or the DCI format 1_1 and a time of a corresponding HARQ-ACK transmission on the PUCCH.

A UE is not expected to monitor PDCCH when the UE performs RRM measurements over a bandwidth that is not within the active DL BWP for the UE.

The next-generation wireless communication system has aimed to use a wide frequency band and support various services or requirements. For example, in New Radio (NR) requirements of 3GPP, in case of Ultra Reliable and Low Latency Communications (URLLC) that is one of representative scenarios, it may require low latency high reliability requirements in which a user plane delay time of 0.5 ms and X-bite data have to be transmitted within an error rate of 10^−5 within 1 ms.

A traffic of the URLLC has a file size within tens to hundreds of bytes and sporadically occurs, unlike enhanced Mobile Broadband (eMBB) with a large traffic capacity.

Thus, the eMBB requires a transmission capable of maximizing a transfer rate and minimizing an overhead of control information, whereas the URLLC requires a reliable transmission method with a short scheduling time unit.

A reference time unit assumed and/or used to transmit and receive a physical channel may be variously configured according an applied field or a type of traffic. The reference time unit may be a basic unit for scheduling a specific physical channel. The reference time unit may vary depending on the number of symbols constituting a corresponding scheduling unit and/or a subcarrier spacing, or the like.

The present disclosure is described based on a slot and a mini-slot as a reference time unit for convenience of explanation. For example, the slot may be a scheduling basic unit used in a normal data traffic (e.g., eMBB).

The mini-slot may have a shorter time duration than a slot in the time domain. The mini-slot may be a scheduling basic unit used in a traffic of more special purpose or a communication scheme (e.g., URLLC, unlicensed band or millimeter wave, etc.).

However, this is merely an example. Even if the eMBB transmits and receives the physical channel based on the mini-slot and/or even if the URLLC or other communication schemes transmit and receive the physical channel based on the slot, it is obvious that methods proposed in the present disclosure can be extended and applied.

In the present disclosure, different PUCCH resources may mean PUCCH resources based on different PUCCH formats, or mean PUCCH resources which are allocated different values in at least one of a frequency (e.g., PRB index), a time (e.g., symbol index) and/or a code (e.g., cyclic shift (CS), orthogonal cover code (OCC) sequence) based on the same PUCCH format. For example, different PUCCH formats may mean PUCCH formats which are different in a structure of a resource element (RE) and/or a symbol, to which uplink control information (UCI) and/or a demodulation reference signal (DMRS) are/is mapped.

And/or, there is a case that uplink control information (UCI) is transmitted periodically to a PUSCH like semi-persistent (SP) channel state information (CSI) on a PUSCH, or a case that uplink control information (UCI) is transmitted to a PUSCH like aperiodic (AP) channel state information (CSI) without an uplink shared channel (UL-SCH). Such a PUSCH transmission may be considered as different PUCCH resources and/or PUCCH formats.

And/or, PUCCH resources (or more broadly, resources of uplink control information) may be distinguished based on a time resource, a frequency resource, a time duration resource, and/or a PUSCH DM-RS mapping type, etc. that are configured for PUSCH transmission.

In the present disclosure, service types may be distinguished by a service requirement, a TTI length, a numerology, and/or a processing time, etc. for downlink (or uplink) data. In other words, different service types may mean that there is a difference in a service requirement, a TI length, a numerology, and/or a processing time, etc. for downlink (or uplink) data.

In the present disclosure, a method of determining and/or configuring a PUCCH resource on which HARQ-ACK is transmitted may also be applied to a method of determining and/or configuring a PUSCH resource on which HARQ-ACK is transmitted.

In a next generation system, for the purpose of support of various service requirements and/or flexible and efficient use of resources, it is considered that HARQ-ACK transmission for reception of a plurality of DL data, which is different in a service type and/or a service requirement (e.g., eMBB or URLLC), a TI length, a numerology, and/or a processing time, is transmitted via a single or a plurality of PUCCHs (or PUSCHs) in one slot. For example, the processing time may be a PDSCH-to-HARQ-ACK timing gap and/or a PDCCH-to-PUSCH timing gap.

The present disclosure proposes an efficient method of allocating and/or transmitting a PUCCH (or PUSCH) resource in the above conditions.

Specifically, the present disclosure proposes a method of constructing and/or transmitting a HARQ-ACK codebook considering a service type, etc. (hereinafter, a first embodiment), and a method of reporting and/or not transmitting HARQ-ACK in a specific case (hereinafter, a second embodiment).

Hereinafter, embodiments of the present disclosure are divided only for convenience of explanation, and it is obvious that a partial method and/or a partial configuration of an embodiment may be substituted by a method and/or a configuration of other embodiments, or they may be combined and applied.

Furthermore, a slot, a subframe, a frame, etc. mentioned in embodiments of the present disclosure may correspond to detailed examples of predetermined time units used in a wireless communication system. That is, when applying methods proposed in the present disclosure, a time unit, etc. may also be applied by being replaced by other time units which are applied for other wireless communication systems.

First Embodiment

First, it is described a method of constructing and/or transmitting a HARQ-ACK codebook considering a service type, etc.

In particular, a first embodiment is described by being divided into a method of separately constructing (or comprising) a HARQ-ACK codebook according to a service type, etc. (hereinafter, method 1), a method of determining a PUCCH resource according to a service type, etc. when HARQ-ACK transmission is transmitted via a plurality of PUCCHs (or PUSCHs) in one slot (hereinafter, method 2), a method of separately configuring a HARQ-ACK processing time according to a service type, etc. (hereinafter, method 3), and a method of determining a PUCCH (or PUSCH) resource according to a PDCCH (or DCI) when HARQ-ACK transmission is transmitted via a plurality of PUCCHs (or PUSCHs) in one slot (hereinafter, method 4).

Methods described below are divided only for convenience of explanation, and it is obvious that a configuration of a certain method may be substituted by a configuration of other methods, or they may be combined and applied.

(Method 1)

First, when HARQ-ACK transmission for a plurality of downlink data is transmitted via a single or a plurality of PUCCHs (or PUSCHs) in one slot, a method of separately constructing a HARQ-ACK codebook according to a service type, etc. is described in detail.

If HARQ-ACK transmission for a plurality of downlink data with different service types, service requirements, TTI lengths, numerologies, and/or processing times is transmitted via a single or a plurality of PUCCHs (or PUSCHs) in one slot, a rule may be defined, promised and/or configured such that a HARQ-ACK codebook is separately constructed. This may also mean that HARQ-ACK (codebook) part1 and part2 are defined and/or supported.

With respect to how to configure the corresponding part1 and part2, a base station (network) may configure HARQ-ACKs mapped to respective part1 and part2 according to different service types, service requirements, TI lengths, numerologies, and/or processing times, or the HARQ-ACKs mapped to respective part1 and part2 may be determined according to a certain rule. The HARQ-ACK part1 and part2 according to a HARQ-ACK codebook may be transmitted via a separate channel or a shared channel through separate encoding or transmitted by jointly encoding the part1 and the part2. The part1 may generally have a higher priority than the part2, and conditions for which the part1 and the part2 are mapped may operate differently for each PUCCH channel or according to beta offset, etc. Here, the HARQ-ACK codebook construction may include an operation of determining the number and/or indexing of HARQ-ACK bits to be transmitted on PUCCH (or PUSCH).

For example, if a semi-static codebook is configured, a HARQ-ACK codebook may be constructed for each HARQ-ACK for a plurality of downlink data with different service types, service requirements, TTI lengths, numerologies, and/or processing times.

And/or, if a dynamic codebook is configured, a value of counter DAI may be separately determined for HARQ-ACK for a plurality of downlink data with different service types, service requirements, TTI lengths, numerologies, and/or processing times. For the total DAI, one value of the total DAI may be determined if HARQ-ACK is transmitted via one channel in one slot, and a value of the total DAI may be separately determined if HARQ-ACK is transmitted via a plurality of channels in one slot.

And/or, a UE may be separately configured whether to consider the semi-static codebook or the dynamic codebook for HARQ-ACK for a plurality of downlink data with different service types, service requirements, TTI lengths, numerologies, and/or processing times. And/or, a method of constructing HARQ-ACK (codebook) part1 and part2 may be a method of constructing a set for PDSCHs to which the semi-static codebook is configured and a set for PDSCHs to which the dynamic codebook is configured, or for the part1 and the part2, an associated set of CORESETs may independently exist, or an associated search space set may be separately assumed.

For example, the semi-static codebook may be configured for eMBB HARQ-ACK, and the dynamic codebook may be configured for URLLC HARQ-ACK. This may be useful because it may not be preferable to configure HARQ-ACK feedback bits by always considering HARQ-ACK bits for URLLC downlink data when a traffic of URLLC is sporadically generated and is assumed that the traffic is not generated relatively frequently. And/or, the dynamic codebook may be configured for eMBB HARQ-ACK, and the semi-static codebook may be configured for URLLC HARQ-ACK.

And/or, different codebooks may be respectively configured for PDSCH in which a processing time is equal to or greater than a predetermined value and PDSCH in which a processing time is equal to or less than a predetermined value (or for each duration by grouping processing times).

And/or, HARQ-ACKs mapped to the HARQ-ACK (codebook) part1 and part2 may include HARQ-ACKs that correspond to PDSCHs scheduled by PDCCHs which are transmitted on CORESET #x and CORESET #y, respectively. The semi-static or dynamic codebook may be configured for each CORESET, or part1 or part2 may be configured for each CORESET. The semi-static codebook may be assumed for the part1, and the dynamic codebook may be assumed for the part2. All the HARQ-ACKs can be mapped to the part1 or the part2 according to a configuration. It may be assumed that HARQ-ACK bit is configured for each HARQ-ACK part and transmitted according to transmission schemes of part1 and part2.

And/or, a separate HARQ-ACK bundling may be configured, or previously promised, defined, and/or configured for HARQ-ACKs for a plurality of downlink data with different service types, service requirements, TTI lengths, numerologies, and/or processing times.

Characteristically, if HARQ-ACKs for a plurality of downlink data with different service types, service requirements, TTI lengths, numerologies, and/or processing times are transmitted together on one channel, a rule may be defined, promised, and/or configured such that a spatial, carrier-domain, and/or time-domain bundling is applied for a HARQ-ACK for a specific service type, service requirement, TTI length, numerology, and/or processing time. For example, a rule may be defined, promised, and/or configured such that a bundling is applied for HARQ-ACK for eMBB PDSCH (or PDSCH with a less strict BLER requirement than $10^{-x}$).

And/or, a rule may be defined, promised, and/or configured such that a bundling is applied for HARQ-ACK for PDSCHs which are configured and/or indicated so as to use a specific modulation and coding scheme (MCS) table. And/or, whether to apply a bundling for each service type, service requirement, TTI length, numerology, and/or processing time may be independently configured to a UE via higher layer signaling.

And/or, as above, the service type and/or the service requirement may be configured via higher layer signaling, or explicitly indicated via downlink control information (DCI) scheduling downlink data, or distinguished through a search space to which PDCCH scheduling downlink data belongs, a control resource set (CORESET) to which PDCCH scheduling downlink data belongs, RNTI, DCI format, and/or CRC masking of PDCCH. Further, if the service type and/or the service requirement are not explicitly distinguished, the "HARQ-ACK for a plurality of downlink data with different service types and/or service requirements" may be replaced by "HARQ-ACK for a plurality of downlink data scheduled through different search spaces, different CORESETs, different RNTIs, different DCI formats, and/or different CRC masking of PDCCH", and the above proposals may be applied.

If HARQ-ACK (codebook) is divided into part1 and part2, an example of attributes for part1 and part2 may be as follows.

1) The part1 and the part2 differently configure a codebook generation scheme. The part1 and the part2 may include bits by a semi-static codebook and a dynamic codebook, respectively.
2) The part1 and the part2 may be divided into a fixed size and a variable size. A size of the part1 may be of a fixed size or use a known value between a base station and a UE, and a size of the part2 may be of a variable size and use different sizes according to quality of service (QoS) requirement of the UE or a current signal to interference & noise ratio (SINR) and/or channel state information (CSI), etc., or may vary according to a network configuration (which is dynamic or static). For example, a final bit number for the part2 may be determined by reducing the number of bits determined by a semi-static codebook and/or a dynamic codebook as necessary or according to a predefined rule. Such a size of the part2 may also be included in part 1 and transmitted.

And/or, a mapping scheme of the part1 and the part2 may consider the followings.
1) The part1 may be always transmitted, and the part2 may be transmitted with a best effort only in the case of PUSCH.
2) The part1 may be always transmitted, and the part2 may be transmitted at a code rate suitable for a remaining resource element (RE).

(Method 2)

Next, when a HARQ-ACK transmission is transmitted via a plurality of PUCCHs (or PUSCHs) in one slot, a method of determining a PUCCH resource according to a service type, etc. is described in detail.

If HARQ-ACK transmission for a plurality of downlink data with different service types, service requirements, TTI lengths, numerologies, and/or processing times is transmitted via a plurality of PUCCHs (or PUSCHs) in one slot, a PUCCH in which each HARQ-ACK bit is included may be determined considering the following.

Even if HARQ-ACK transmission timings of eMBB HARQ-ACK and URLLC HARQ-ACK are in the same slot, a rule may be defined, promised, and/or configured such that they are transmitted on different PUCCHs (or PUSCHs) in the corresponding slot.

And/or, it may be determined that HARQ-ACK for the corresponding PDSCH is transmitted on which channel of the plurality of PUCCHs (or PUSCHs) in one slot according to a configured and/or indicated MCS table.

And/or, for a PDSCH in which a processing time is equal to or greater than a predetermined value and a PDSCH in which a processing time is equal to or less than a predetermined value (or for each group by preconfiguring a grouping for processing times by appointment or configuring and/or indicating them through a higher layer signal and/or a physical layer signal), it may be determined that HARQ-ACK for the corresponding PDSCH is transmitted on which channel of the plurality of PUCCHs (or PUSCHs) in one slot. For example, the HARQ-ACK may be transmitted on PUCCH resource 1 for PDSCHs, in which a PDSCH-to-HARQ-ACK timing gap is 8, 7, 6, and 5 slots, and on PUCCH resource 2 for PDSCHs in which a PDSCH-to-HARQ-ACK timing gap is 4, 3, 2 and 1 slots.

And/or, total HARQ-ACK bits in a slot determined based on a processing time may be distributed per PUCCH resource in the corresponding slot. For example, if four PUCCHs are transmitted in one slot, the total HARQ-ACK bits may be divided into four groups and transmitted to each PUCCH. For example, if the total HARQ-ACK bits are 12 bits, the HARQ-ACK bits may be divided into 3, 3, 3, and 3 bits, and if the total HARQ-ACK bits are 10 bits, the HARQ-ACK bits may be divided into 3, 3, 2, and 2 bits or 3, 3, 3, and 1 bits as equal as possible.

And/or, the processing time may be divided into four groups, and the corresponding HARQ-ACK bits may be transmitted to each PUCCH. For example, PDSCHs in which the PDSCH-to-HARQ-ACK timing gap is 8 and 7 slots may transmit the HARQ-ACK on PUCCH resource 1; PDSCHs in which the PDSCH-to-HARQ-ACK timing gap is 6 and 5 slots may transmit the HARQ-ACK on PUCCH resource 2; PDSCHs in which the PDSCH-to-HARQ-ACK timing gap is 4 and 3 slots may transmit the HARQ-ACK on PUCCH resource 3; and PDSCHs in which the PDSCH-to-HARQ-ACK timing gap is 2 and 1 slots may transmit the HARQ-ACK on PUCCH resource 4.

And/or, the HARQ-ACK may be transmitted on PUCCH resource 1 for PDSCHs with a less strict block error rate (BLER) requirement than $10^{-x}$ and on PUCCH resource 2 for PDSCHs with a stricter BLER requirement than $10^{-x}$.

And/or, a slot may (virtually) consist of transmission time intervals (TTIs) with a plurality of small time units by the number which is predefined, configured via a higher layer signal and/or indicated through a physical layer signal, and a separate HARQ-ACK codebook may be constructed (or determined, generated) for each TTI. For example, if a slot is configured and/or indicated to consist of two mini-slots, HARQ-ACK corresponding to a PDSCH transmitted in a first mini-slot of each slot may be considered as a HARQ-ACK bit of a PUCCH transmitted in a first mini-slot in a PUCCH transport slot indicated by a processing time, and HARQ-ACK corresponding to a PDSCH transmitted in a second mini-slot of each slot may be considered as a HARQ-ACK bit of a PUCCH transmitted in a second mini-slot in the PUCCH transport slot indicated by a processing time.

The service type and/or the service requirement may be configured via the higher layer signal, or indicated explicitly via downlink control information (DCI) scheduling downlink data, or distinguished through a search space to which the PDCCH scheduling downlink data belongs, a control resource set (CORESET) to which the PDCCH scheduling downlink data belongs, RNTI, DCI format, and/or CRC masking of PDCCH. Further, if the service type and/or the service requirement are not explicitly distinguished, the "HARQ-ACK for a plurality of downlink data with different service types and/or service requirements" may be replaced by "HARQ-ACK for a plurality of downlink data scheduled through different search spaces, different CORESETs, different RNTIs, different DCI formats, and/or different CRC masking of PDCCH", and the above proposals may be applied.

(Method 3)

Next, a method of separately configuring a HARQ-ACK processing time according to a service type, etc. is described in detail.

A rule may be defined, promised and/or configured such that a set of processing times (e.g., PDSCH-to-HARQ-ACK timing gap) k1 for different service types and/or service requirements is separately configured through a higher layer. And/or, a rule may be defined, promised and/or configured such that time-domain resource allocation tables for different service types, service requirements, and/or processing times are independently configured through the higher layer. And/or, one time-domain resource allocation table may be configured without regard to the service type, the service requirement and/or the processing time.

The service type and/or the service requirement may be configured via higher layer signal, or indicated explicitly via downlink control information (DCI) scheduling downlink data, or distinguished through a search space to which the PDCCH scheduling downlink data belongs, a control resource set (CORESET) to which the PDCCH scheduling downlink data belongs, RNTI, DCI format, and/or CRC masking of PDCCH. Further, if the service type and/or the service requirement are not explicitly distinguished, the "PDSCH with different service types and/or service requirements" may be replaced by "PDSCH scheduled through different search spaces, different CORESETs, different RNTIs, different DCI formats, and/or different CRC masking of PDCCH", and the above proposals may be applied.

(Method 4)

Next, when a HARQ-ACK transmission is transmitted via a plurality of PUCCHs (or PUSCHs) in one slot, a method of determining a PUCCH (or PUSCH) resource according to a PDCCH (or DCI) is described in detail.

If HARQ-ACK transmission for a plurality of downlink data is transmitted on a plurality of PUCCHs (or PUSCHs) in one slot, a PUCCH resource may be determined and/or configured as follows.

A rule may be defined, promised, and/or configured such that a plurality of resources (or resource subsets) is interworked in a state indicated as a "PUCCH resource indicator" and is configured to a UE, and a PUCCH resource to be finally used in HARQ-ACK transmission for a PDSCH is determined according to a service type and/or a service requirement (e.g., eMBB or URLLC) for the corresponding PDSCH, a processing time, a search space, CORESET, a DCI format, RNTI, CRC masking of PDCCH, and/or a value indicated by a specific field (other than the "PUCCH resource indicator") in downlink control information (DCI), etc.

And/or, a rule may be defined, promised, and/or configured such that different resource sets are used in the HARQ-ACK transmission for a PDSCH according to a service type and/or a service requirement (e.g., eMBB or URLLC) for the corresponding PDSCH, a processing time, a search space, CORESET, a DCI format, RNTI, CRC masking of PDCCH, and/or a value indicated by a specific field (other than the "PUCCH resource indicator") in DCI, etc. Alternatively, a rule may be defined, promised, and/or configured such that a resource set is determined by considering together the service type and/or the service requirement (e.g., eMBB or URLLC) except a payload size of PUCCH, the search space, the CORESET, the DCI format, the RNTI, the CRC masking of PDCCH, and/the value indicated by the specific field (other than the "PUCCH resource indicator") in DCI.

And/or, when a PUCCH resource is configured, a plurality of starting symbols and a length may be configured (or one starting symbol, a length, and a plurality of offsets may be configured), and hence a time domain PUCCH resource corresponding to a plurality of PUCCHs may be determined in a slot. According to a service type and/or a service requirement (e.g., eMBB or URLLC) for a PDSCH, a processing time, a search space, a CORESET, a DCI format, RNTI, CRC masking of PDCCH and/or a value indicated by a specific field (other than the "PUCCH resource indicator") in DCI, it may be determined that HARQ-ACK for the corresponding PDSCH is transmitted on which PUCCH resource of a plurality of PUCCHs in a slot.

A processing time for a specific service type and/or a specific service requirement (e.g., URLLC) may be represented by a finer time unit than a time unit (e.g., slot) of the existing processing time. For example, the processing time for the specific service type and/or the specific service requirement (e.g., URLLC) may be configured on a per symbol basis or a per slot+symbol basis.

In this instance, a length of symbol may be determined by a default numerology (e.g., based on 15 kHz or a preconfigured numerology), a numerology of PDCCH and/or PDSCH, or a numerology of PUCCH and/or PUSCH.

Second Embodiment

Next, a method of not reporting HARQ-ACK in a specific case is described in detail.

For downlink data which has a specific service type and/or a specific service requirement (e.g., URLLC), to which a specific processing time is configured, and/or which corresponds to a specific search space, a specific CORESET, a specific DCI format, specific RNTI, specific CRC masking of PDCCH and/or a value indicated by a specific field in DCI, a rule may be defined, promised, and/or configured such that a UE does not report HARQ-ACK. Here, an operation of not reporting the HARQ-ACK may mean not to be included in calculation of the number of bits upon the construction of a HARQ-ACK codebook.

The service type and/or the service requirement may be configured via a higher layer signal, or explicitly indicated via downlink control information (DCI) scheduling downlink data, or distinguished through a search space to which PDCCH scheduling downlink data belongs, a control resource set (CORESET) to which PDCCH scheduling downlink data belongs, RNTI, DCI format, and/or CRC masking of PDCCH. Further, if the service type and/or the service requirement are not explicitly distinguished, the "HARQ-ACK for downlink data with the specific service type and/or the specific service requirement" may be replaced by "HARQ-ACK for downlink data scheduled through a specific search space, a specific CORESET, specific RNTI, a specific DCI format, and/or specific CRC masking of PDCCH", and the above proposals may be applied.

And/or, if an operation of not reporting HARQ-ACK for specific downlink data is indicated for the case that a dynamic codebook is configured, the following method may be considered. DAI corresponding to downlink data in which the HARQ-ACK is not reported may be ignored. That is, when the UE calculates the number of bits upon the construction of a HARQ-ACK codebook, the UE may ignore a DAI field in a PDCCH that schedules the corresponding downlink data.

Since examples of methods proposed in the present disclosure described above may be included as one of implementation methods of the present disclosure, it is obvious that these examples may be regarded as a kind of proposed methods. In addition, the proposed methods described above may be implemented independently, but may also be implemented in a combination (or merger) of some of proposed methods. A rule may be defined such that a base station informs the UE of information on whether to apply the proposed methods (or information on rules of the proposed methods) through a predefined signal (e.g., physical layer signal or higher layer signal).

FIG. 10 is a flow chart illustrating an operation method of a UE proposed in the present disclosure.

Referring to FIG. 10, first, a UE may receive from a base station configuration information for performing transmission and reception on a per subslot basis in S1001. The configuration information may be included in a higher layer signal or a physical layer signal. In the present disclosure, a transmission time unit may be used in the same sense as a transmission time interval (TTI).

The configuration information may include information for the number of subslots included in a slot. For example, if the UE receives configuration information including information that a slot consists of four subslots, the UE may perform transmission and reception on a per subslot basis and construct a separate HARQ-ACK codebook for each subslot.

And/or, the configuration information may be information for configuring a transmission time unit by means of the number of specific symbols not subslots. For example, if a slot consists of 14 symbols, the UE may receive information for configuring a transmission time unit by means of 2 symbols. In this case, the UE may configure the slot by means of 7 transmission time units and may transmit and receive data. Further, an uplink physical channel or a downlink physical channel may be configured according to the configuration information.

Next, the UE may receive from the base station multiple physical downlink shared channels (PDSCHs) based on the configuration information in S1002. For example, based on the configuration information, the UE may perform reception, decoding, and/or processing on a downlink physical channel on a per subslot basis and perform reception, decoding, and/or processing on an uplink physical channel on a per subslot basis. One or more of the multiple PDSCHs may be received in each subslot.

The multiple PDSCHs may mean PUCCHs which are allocated different values in at least one of a frequency (e.g., PRB index), a time (e.g., symbol index), and/or a code (e.g., cyclic shift, orthogonal cover code sequence). And/or, the multiple PDSCHs may mean PDSCHs which are different in a structure of a resource element (RE) and/or a symbol, to which a demodulation reference signal (DMRS) is mapped.

Next, the UE may transmit to the base station a PUCCH including hybrid automatic repeat request (HARQ)-acknowledgement (ACK) information for the multiple PDSCHs in a specific slot in S1003.

The PUCCH may include a first PUCCH transmitted in a first subslot of the specific slot and a second PUCCH transmitted in a second subslot of the specific slot. In other words, the specific slot may include the first subslot and the second subslot, and a separate PUCCH may be transmitted in each subslot.

Further, the first PUCCH and the second PUCCH each may be transmitted based on a separately constructed HARQ-ACK codebook.

For example, the first PUCCH and the second PUCCH each may include a separately constructed HARQ-ACK codebook. In other words, HARQ-ACK information for the first PDSCHs and HARQ-ACK information for the second PDSCHs may be indexed by different pseudo-codes and each may construct a separate HARQ-ACK codebook. Further, if the HARQ-ACK information for the first PDSCHs and the HARQ-ACK information for the second PDSCHs are separately coded and are configured with a dynamic codebook, a downlink assignment index (DAI) may also be separately counted.

The multiple PDSCHs may include first PDSCHs in which a subslot for HARQ-ACK transmission is indicated as the first subslot, and second PDSCHs in which a subslot for HARQ-ACK transmission is indicated as the second subslot. In this instance, HARQ-ACK information for the first PDSCHs may be included in the first PUCCH, and HARQ-ACK information for the second PDSCHs may be included in the second PUCCH. In other words, a HARQ-ACK transmission timing (e.g., K1) may be indicated on a per subslot basis.

And/or, the multiple PDSCHs may include first PDSCHs in which a HARQ-ACK transmission subslot is indicated as a first subslot among PDSCHs received in each subslot, and second PDSCHs in which a HARQ-ACK transmission subslot is indicated as a second subslot among PDSCHs received in each subslot. HARQ-ACK information for the first PDSCHs may be included in the first PUCCH, and HARQ-ACK information for the second PDSCHs may be included in the second PUCCH. In other words, the HARQ-ACK information for the first PDSCHs may construct a different HARQ-ACK codebook from the HARQ-ACK information for the second PDSCHs.

And/or, the multiple PDSCHs may include first PDSCHs in which a HARQ-ACK transmission slot is indicated as a specific slot among PDSCHs received in a first subslot of each slot, and second PDSCHs in which a HARQ-ACK transmission slot is indicated as a specific slot among PDSCHs received in a second subslot of each slot. HARQ-ACK information for the first PDSCHs may be included in the first PUCCH, and HARQ-ACK information for the second PDSCHs may be included in the second PUCCH. Here, the fact that the HARQ-ACK transmission slot has been indicated as the specific slot may mean that a HARQ-ACK transmission timing (or processing time) of the corresponding PDSCH is determined and/or configured as a specific slot.

As above, methods proposed in the present disclosure may transmit a plurality of PUCCHs including a separately constructed HARQ-ACK codebook in one slot.

Here, a timing offset (or processing time) from a subslot and/or a slot receiving a PDSCH to a subslot and/or a slot transmitting HARQ-ACK of the corresponding PDSCH may be transmitted via a higher layer signal or a physical layer signal (e.g., DCI), and/or may be determined and/or configured according to a service type, etc. of the corresponding PDSCH. In addition, the timing offset may be configured based on the number of slots, the number of subslots, the number of symbols, and/or other transmission time units.

Here, the service type may be distinguished, determined and/or configured according to a service requirement, a TTI length, a numerology and/or a processing time, etc. for PDSCH data. For example, if the first PDSCH includes ultra-reliable low-latency communication (URLLC) data, and the second PDSCH includes enhanced Mobile BroadBand (eMBB) data, it may be deemed that the first PDSCH and the second PDSCH have different service types.

And/or, the UE may receive from the base station a physical downlink control channel (PDCCH) including a PUCCH resource indicator. The PUCCH resource indicator may be interworked with specific PUCCH resources (resource set). The PUCCH resource indicator may be interworked with multiple PUCCH resources transmitted in one slot. For example, the PUCCH resource indicator may be interworked with (resource set of) the first PUCCH and the second PUCCH, HARQ-ACK information for the first PDSCHs may be determined to be transmitted via the first PUCCH among resources (the first PUCCH and the second PUCCH) interworked with the PUCCH resource indicator based on a processing time of the first PDSCHs, and HARQ-ACK information for the second PDSCHs may be determined to be transmitted via the second PUCCH among resources interworked with the PUCCH resource indicator based on a processing time of the second PDSCHs.

And/or, if a processing time of the corresponding PDSCH is equal to or less than a preconfigured time, HARQ-ACK information of the corresponding PDSCH may be determined to be transmitted from the first PUCCH, and if the processing time of the corresponding PDSCH is equal to or greater than the preconfigured time, HARQ-ACK information of the corresponding PDSCH may be transmitted from the second PUCCH. Here, the processing time may be a time offset from a reception time of the corresponding PDSCH to a transmission time of the HARQ-ACK information. And/or, the processing time may mean a time required to compute the HARQ-ACK information for the corresponding PDSCH.

And/or, a HARQ-ACK information transmission resource for PDSCH may be determined as one of PUCCH resources interworked with the PUCCH resource indicator, by a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

And/or, the UE may receive from the base station PUCCH resource configuration information including a plurality of starting symbols and a length. In this instance, HARQ-ACK information for the first PDSCHs may be determined to be transmitted via the first PUCCH by a first starting symbol and the length among the plurality of starting symbols and the length based on a processing time of the first PDSCHs, and HARQ-ACK information for the second PDSCHs may be determined to be transmitted via the second PUCCH by a second starting symbol and the length among the plurality of starting symbols and the length based on a processing time of the second PDSCHs.

And/or, a HARQ-ACK information transmission resource for PDSCH may be determined as one of PUCCH resources in one slot by a specific starting symbol and a length among a plurality of starting symbols and a length based on a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

The above description has been given on the assumption that the HARQ-ACK information for PDSCH is transmitted via the PUCCH, but the proposed methods may be applied by replacing the PUCCH by the PUSCH even if the HARQ-ACK information for PDSCH is transmitted via the PUSCH.

Since the operation method of the UE illustrated in FIG. 10 is the same as the operation method of the UE described with reference to FIGS. 1 to 9, a detailed description thereof is omitted.

With regard to this, the UE's operation described above may be specifically implemented by a user equipment 1220 shown in FIG. 12 of the present disclosure. For example, the UE's operation described above may be performed by a processor 1221 and/or an RF unit 1223.

Referring to FIG. 12, first, the processor 1221 may receive from a base station configuration information for performing transmission and reception on a per subslot basis through the RF unit 1223 in S1001. The configuration information may be included in a higher layer signal or a physical layer signal. Here, a transmission time unit may be used in the same sense as a transmission time interval (TTI).

The configuration information may include information for the number of subslots included in a slot. For example, if the UE receives configuration information including information that a slot consists of four subslots, the UE may perform transmission and reception on a per subslot basis and construct a separate HARQ-ACK codebook for each subslot.

And/or, the configuration information may be information for configuring a transmission time unit by means of the number of specific symbols not subslots. For example, if a slot consists of 14 symbols, the UE may receive information for configuring a transmission time unit by means of 2 symbols. In this case, the UE may configure the slot by means of 7 transmission time units and may transmit and receive data. Further, an uplink physical channel or a downlink physical channel may be configured according to the configuration information.

Next, the processor 1221 may receive from the base station multiple physical downlink shared channels (PDSCHs) based on the configuration information through the RF unit 1223 in S1002. For example, based on the configuration information, the UE may perform reception, decoding, and/or processing on a downlink physical channel on a per subslot basis, and perform reception, decoding, and/or processing on an uplink physical channel on a per subslot basis. One or more of the multiple PDSCHs may be received in each subslot.

The multiple PDSCHs may mean PUCCHs which are allocated different values in at least one of a frequency (e.g., PRB index), a time (e.g., symbol index), and/or a code (e.g., cyclic shift, orthogonal cover code sequence). And/or, the multiple PDSCHs may mean PDSCHs which are different in a structure of a resource element (RE) and/or a symbol, to which a demodulation reference signal (DMRS) is mapped.

Next, the processor 1221 may transmit to the base station a PUCCH including hybrid automatic repeat request (HARQ)-acknowledgement (ACK) information for the multiple PDSCHs in a specific slot through the RF unit 1223 in S1003.

The PUCCH may include a first PUCCH transmitted in a first subslot of the specific slot and a second PUCCH transmitted in a second subslot of the specific slot. In other words, the specific slot may include the first subslot and the second subslot, and a separate PUCCH may be transmitted in each subslot.

Further, the first PUCCH and the second PUCCH each may be transmitted based on a separately constructed HARQ-ACK codebook.

For example, the first PUCCH and the second PUCCH each may include a separately constructed HARQ-ACK codebook. In other words, HARQ-ACK information for the first PDSCHs and HARQ-ACK information for the second PDSCHs may be indexed by different pseudo-codes and each may construct a separate HARQ-ACK codebook. Further, if the HARQ-ACK information for the first PDSCHs and the HARQ-ACK information for the second PDSCHs are separately coded and are configured with a dynamic codebook, a downlink assignment index (DAI) may also be separately counted.

The multiple PDSCHs may include first PDSCHs in which a subslot for HARQ-ACK transmission is indicated as a first subslot, and second PDSCHs in which a subslot for HARQ-ACK transmission is indicated as a second subslot. In this instance, HARQ-ACK information for the first PDSCHs may be included in the first PUCCH, and HARQ-ACK information for the second PDSCHs may be included in the second PUCCH. In other words, a HARQ-ACK transmission timing (e.g., K1) may be indicated on a per subslot basis.

And/or, the multiple PDSCHs may include first PDSCHs in which a HARQ-ACK transmission subslot is indicated as a first subslot among PDSCHs received in each subslot, and second PDSCHs in which a HARQ-ACK transmission subslot is indicated as a second subslot among PDSCHs received in each subslot. HARQ-ACK information for the first PDSCHs may be included in the first PUCCH, and HARQ-ACK information for the second PDSCHs may be included in the second PUCCH. In other words, the HARQ-ACK information for the first PDSCHs may construct a different HARQ-ACK codebook from the HARQ-ACK information for the second PDSCHs.

And/or, the multiple PDSCHs may include first PDSCHs in which a HARQ-ACK transmission slot is indicated as a specific slot among PDSCHs received in a first subslot of each slot, and second PDSCHs in which a HARQ-ACK transmission slot is indicated as a specific slot among PDSCHs received in a second subslot of each slot. HARQ-ACK information for the first PDSCHs may be included in the first PUCCH, and HARQ-ACK information for the second PDSCHs may be included in the second PUCCH. Here, the fact that the HARQ-ACK transmission slot has been indicated as the specific slot may mean that a HARQ-ACK transmission timing (or processing time) of the corresponding PDSCH is determined and/or configured as a specific slot.

As above, methods proposed in the present disclosure may transmit a plurality of PUCCHs including a separately constructed HARQ-ACK codebook in one slot.

Here, a timing offset (or processing time) from a subslot and/or a slot receiving a PDSCH to a subslot and/or a slot transmitting HARQ-ACK of the corresponding PDSCH may be transmitted via a higher layer signal or a physical layer signal (e.g., DCI), and/or may be determined and/or configured according to a service type, etc. of the corresponding PDSCH. In addition, the timing offset may be configured based on the number of slots, the number of subslots, the number of symbols, and/or other transmission time units.

Here, the service type may be distinguished, determined and/or configured according to a service requirement, a TTI length, a numerology and/or a processing time, etc. for PDSCH data. For example, if the first PDSCH includes ultra-reliable low-latency communication (URLLC) data, and the second PDSCH includes enhanced Mobile BroadBand (eMBB) data, it may be deemed that the first PDSCH and the second PDSCH have different service types.

And/or, the UE may receive from the base station a physical downlink control channel (PDCCH) including a PUCCH resource indicator. The PUCCH resource indicator may be interworked with specific PUCCH resources (resource set). The PUCCH resource indicator may be interworked with multiple PUCCH resources transmitted in one slot. For example, the PUCCH resource indicator may be interworked with (resource set of) the first PUCCH and the second PUCCH, HARQ-ACK information for the first PDSCHs may be determined to be transmitted via the first PUCCH among resources (the first PUCCH and the second PUCCH) interworked with the PUCCH resource indicator based on a processing time of the first PDSCHs, and HARQ-ACK information for the second PDSCHs may be determined to be transmitted via the second PUCCH among resources interworked with the PUCCH resource indicator based on a processing time of the second PDSCHs.

And/or, if a processing time of the corresponding PDSCH is equal to or less than a preconfigured time, HARQ-ACK information of the corresponding PDSCH may be determined to be transmitted from the first PUCCH, and if the processing time of the corresponding PDSCH is equal to or greater than the preconfigured time, HARQ-ACK information of the corresponding PDSCH may be transmitted from the second PUCCH. Here, the processing time may be a time offset from a reception time of the corresponding PDSCH to a transmission time of the HARQ-ACK information. And/or, the processing time may mean a time required to compute the HARQ-ACK information for the corresponding PDSCH.

And/or, a HARQ-ACK information transmission resource for PDSCH may be determined as one of PUCCH resources interworked with the PUCCH resource indicator, by a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

And/or, the UE may receive from the base station PUCCH resource configuration information including a plurality of starting symbols and a length. In this instance, HARQ-ACK information for the first PDSCHs may be determined to be transmitted via the first PUCCH by a first starting symbol and the length among the plurality of starting symbols and the length based on a processing time of the first PDSCHs, and HARQ-ACK information for the second PDSCHs may be determined to be transmitted via the second PUCCH by a second starting symbol and the length among the plurality of starting symbols and the length based on a processing time of the second PDSCHs.

And/or, a HARQ-ACK information transmission resource for PDSCH may be determined as one of PUCCH resources in one slot by a specific starting symbol and a length among a plurality of starting symbols and a length based on a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

The above description has been given on the assumption that the HARQ-ACK information for PDSCH is transmitted via the PUCCH, but the proposed methods may be applied by replacing the PUCCH by the PUSCH even if the HARQ-ACK information for PDSCH is transmitted via the PUSCH.

Since the operation of the UE illustrated in FIG. 12 is the same as the operation of the UE described with reference to FIGS. 1 to 10, a detailed description thereof is omitted.

FIG. 11 is a flow chart illustrating an operation method of a base station proposed in the present disclosure.

Referring to FIG. 11, first, a base station may transmit, to a UE, configuration information for performing transmission and reception on a per subslot basis in S1101. The configuration information may be included in a higher layer signal or a physical layer signal. Here, a transmission time unit may be used in the same sense as a transmission time interval (TTI).

The configuration information may include information for the number of subslots included in a slot. For example, if the UE receives configuration information including information that a slot consists of four subslots, the UE may perform transmission and reception on a per subslot basis and construct a separate HARQ-ACK codebook for each subslot.

And/or, the configuration information may be information for configuring a transmission time unit by means of the number of specific symbols not subslots. For example, if a slot consists of 14 symbols, the UE may receive information for configuring a transmission time unit by means of 2 symbols. In this case, the UE may configure the slot by means of 7 transmission time units and may transmit and receive data. Further, an uplink physical channel or a downlink physical channel may be configured according to the configuration information.

Next, the base station may transmit to the UE multiple physical downlink shared channels (PDSCHs) based on the configuration information in S1102. For example, based on the configuration information, the UE may perform reception, decoding, and/or processing on a downlink physical channel on a per subslot basis and perform reception, decoding, and/or processing on an uplink physical channel on a per subslot basis. One or more of the multiple PDSCHs may be received in each subslot.

The multiple PDSCHs may mean PUCCHs which are allocated different values in at least one of a frequency (e.g., PRB index), a time (e.g., symbol index), and/or a code (e.g., cyclic shift, orthogonal cover code sequence). And/or, the multiple PDSCHs may mean PDSCHs which are different in a structure of a resource element (RE) and/or a symbol, to which a demodulation reference signal (DMRS) is mapped.

Next, the base station may receive from the UE a PUCCH including hybrid automatic repeat request (HARQ)-acknowledgement (ACK) information for the multiple PDSCHs in a specific slot in S1103.

The PUCCH may include a first PUCCH received in a first subslot of the specific slot and a second PUCCH received in a second subslot of the specific slot. In other words, the specific slot may include the first subslot and the second subslot, and a separate PUCCH may be received in each subslot.

Further, the first PUCCH and the second PUCCH each may be received based on a separately constructed HARQ-ACK codebook.

For example, the first PUCCH and the second PUCCH each may include a separately constructed HARQ-ACK codebook. In other words, HARQ-ACK information for the first PDSCHs and HARQ-ACK information for the second PDSCHs may be indexed by different pseudo-codes and each may construct a separate HARQ-ACK codebook. Further, if the HARQ-ACK information for the first PDSCHs and the HARQ-ACK information for the second PDSCHs are separately coded and are configured with a dynamic codebook, a downlink assignment index (DAI) may also be separately counted.

The multiple PDSCHs may include first PDSCHs in which a subslot for HARQ-ACK transmission is indicated as the first subslot, and second PDSCHs in which a subslot for HARQ-ACK transmission is indicated as the second subslot. In this instance, HARQ-ACK information for the first PDSCHs may be included in the first PUCCH, and HARQ-ACK information for the second PDSCHs may be included in the second PUCCH. In other words, a HARQ-ACK transmission timing (e.g., K1) may be indicated on a per subslot basis.

And/or, the multiple PDSCHs may include first PDSCHs in which a HARQ-ACK transmission subslot is indicated as a first subslot among PDSCHs transmitted in each subslot, and second PDSCHs in which a HARQ-ACK transmission subslot is indicated as a second subslot among PDSCHs transmitted in each subslot. HARQ-ACK information for the first PDSCHs may be included in the first PUCCH, and HARQ-ACK information for the second PDSCHs may be included in the second PUCCH. In other words, the HARQ-ACK information for the first PDSCHs may construct a different HARQ-ACK codebook from the HARQ-ACK information for the second PDSCHs.

And/or, the multiple PDSCHs may include first PDSCHs in which a HARQ-ACK transmission slot is indicated as a specific slot among PDSCHs transmitted in a first subslot of each slot, and second PDSCHs in which a HARQ-ACK transmission slot is indicated as a specific slot among PDSCHs transmitted in a second subslot of each slot. HARQ-ACK information for the first PDSCHs may be included in the first PUCCH, and HARQ-ACK information for the second PDSCHs may be included in the second PUCCH. Here, the fact that the HARQ-ACK transmission slot has been indicated as the specific slot may mean that a HARQ-ACK transmission timing (or processing time) of the corresponding PDSCH is determined and/or configured as a specific slot.

As above, methods proposed in the present disclosure may transmit a plurality of PUCCHs including a separately constructed HARQ-ACK codebook in one slot.

Here, a timing offset (or processing time) from a subslot and/or a slot transmitting a PDSCH to a subslot and/or a slot receiving HARQ-ACK of the corresponding PDSCH may be transmitted via a higher layer signal or a physical layer signal (e.g., DCI), and/or may be determined and/or configured according to a service type, etc. of the corresponding PDSCH. In addition, the timing offset may be configured based on the number of slots, the number of subslots, the number of symbols, and/or other transmission time units.

Here, the service type may be distinguished, determined and/or configured according to a service requirement, a TTI length, a numerology and/or a processing time, etc. for PDSCH data. For example, if the first PDSCH includes ultra-reliable low-latency communication (URLLC) data, and the second PDSCH includes enhanced Mobile Broad-Band (eMBB) data, it may be deemed that the first PDSCH and the second PDSCH have different service types.

And/or, the base station may transmit to the UE a physical downlink control channel (PDCCH) including a PUCCH resource indicator. The PUCCH resource indicator may be interworked with specific PUCCH resources (resource set). The PUCCH resource indicator may be interworked with multiple PUCCH resources transmitted in one slot. For example, the PUCCH resource indicator may be interworked with (resource set of) the first PUCCH and the second PUCCH, HARQ-ACK information for the first PDSCHs may be determined to be received via the first PUCCH among resources (the first PUCCH and the second PUCCH) interworked with the PUCCH resource indicator based on a processing time of the first PDSCHs, and HARQ-ACK information for the second PDSCHs may be determined to be received via the second PUCCH among resources interworked with the PUCCH resource indicator based on a processing time of the second PDSCHs.

And/or, if a processing time of the corresponding PDSCH is equal to or less than a preconfigured time, HARQ-ACK information of the corresponding PDSCH may be determined to be received from the first PUCCH, and if the processing time of the corresponding PDSCH is equal to or greater than the preconfigured time, HARQ-ACK information of the corresponding PDSCH may be received from the second PUCCH. Here, the processing time may be a time offset from a transmission time of the corresponding PDSCH to a reception time of the HARQ-ACK information. And/or, the processing time may mean a time required to compute the HARQ-ACK information for the corresponding PDSCH.

And/or, a HARQ-ACK information reception resource for PDSCH may be determined as one of PUCCH resources interworked with the PUCCH resource indicator, by a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

And/or, the base station may transmit to the UE PUCCH resource configuration information including a plurality of starting symbols and a length. In this instance, HARQ-ACK information for the first PDSCHs may be determined to be received via the first PUCCH by a first starting symbol and the length among the plurality of starting symbols and the length based on a processing time of the first PDSCHs, and HARQ-ACK information for the second PDSCHs may be determined to be received via the second PUCCH by a second starting symbol and the length among the plurality of starting symbols and the length based on a processing time of the second PDSCHs.

And/or, a HARQ-ACK information reception resource for PDSCH may be determined as one of PUCCH resources in one slot by a specific starting symbol and a length among a plurality of starting symbols and a length based on a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

The above description has been given on the assumption that the HARQ-ACK information for PDSCH is received via the PUCCH, but the proposed methods may be applied by replacing the PUCCH by the PUSCH even if the HARQ-ACK information for PDSCH is received via the PUSCH.

Since the operation method of the base station illustrated in FIG. 11 is the same as the operation method of the base station described with reference to FIGS. 1 to 10, a detailed description thereof is omitted.

With regard to this, the operation of the base station described above may be specifically implemented by a base station 1210 shown in FIG. 12 of the present disclosure. For example, the operation of the base station described above may be performed by a processor 1211 and/or an RF unit 1213.

Referring to FIG. 12, first, the processor 1211 may transmit to a UE configuration information for performing transmission and reception on a per subslot basis through the RF unit 1213 in S1101. The configuration information may be included in a higher layer signal or a physical layer signal. Here, a transmission time unit may be used in the same sense as a transmission time interval (TTI).

The configuration information may include information for the number of subslots included in a slot. For example, if the UE receives configuration information including information that a slot consists of four subslots, the UE may perform transmission and reception on a per subslot basis and construct a separate HARQ-ACK codebook for each subslot.

And/or, the configuration information may be information for configuring a transmission time unit by means of the number of specific symbols not subslots. For example, if a slot consists of 14 symbols, the UE may receive information for configuring a transmission time unit by means of 2 symbols. In this case, the UE may configure the slot by means of 7 transmission time units and may transmit and receive data. Further, an uplink physical channel or a downlink physical channel may be configured according to the configuration information.

Next, the processor 1211 may transmit to the UE multiple physical downlink shared channels (PDSCHs) based on the configuration information through the RF unit 1213 in S1102. For example, based on the configuration information, the UE may perform reception, decoding, and/or processing on a downlink physical channel on a per subslot basis and perform reception, decoding, and/or processing on an uplink physical channel on a per subslot basis. One or more of the multiple PDSCHs may be received in each subslot.

The multiple PDSCHs may mean PUCCHs which are allocated different values in at least one of a frequency (e.g., PRB index), a time (e.g., symbol index), and/or a code (e.g., cyclic shift, orthogonal cover code sequence). And/or, the multiple PDSCHs may mean PDSCHs which are different in a structure of a resource element (RE) and/or a symbol, to which a demodulation reference signal (DMRS) is mapped.

Next, the processor 1211 may receive from the UE a PUCCH including hybrid automatic repeat request (HARQ)-acknowledgement (ACK) information for the multiple PDSCHs in a specific slot through the RF unit 1213 in S1003.

The PUCCH may include a first PUCCH received in a first subslot of the specific slot and a second PUCCH received in a second subslot of the specific slot. In other words, the specific slot may include the first subslot and the second subslot, and a separate PUCCH may be received in each subslot.

Further, the first PUCCH and the second PUCCH each may be received based on a separately constructed HARQ-ACK codebook.

For example, the first PUCCH and the second PUCCH each may include a separately constructed HARQ-ACK codebook. In other words, HARQ-ACK information for the first PDSCHs and HARQ-ACK information for the second PDSCHs may be indexed by different pseudo-codes and each may construct a separate HARQ-ACK codebook. Further, if the HARQ-ACK information for the first PDSCHs and the HARQ-ACK information for the second PDSCHs are separately coded and are configured with a dynamic codebook, a downlink assignment index (DAI) may also be separately counted.

The multiple PDSCHs may include first PDSCHs in which a subslot for HARQ-ACK transmission is indicated as a first subslot, and second PDSCHs in which a subslot for HARQ-ACK transmission is indicated as a second subslot. In this instance, HARQ-ACK information for the first PDSCHs may be included in the first PUCCH, and HARQ-ACK information for the second PDSCHs may be included in the second PUCCH. In other words, a HARQ-ACK transmission timing (e.g., K1) may be indicated on a per subslot basis.

And/or, the multiple PDSCHs may include first PDSCHs in which a HARQ-ACK transmission subslot is indicated as a first subslot among PDSCHs transmitted in each subslot, and second PDSCHs in which a HARQ-ACK transmission subslot is indicated as a second subslot among PDSCHs transmitted in each subslot. HARQ-ACK information for the first PDSCHs may be included in the first PUCCH, and HARQ-ACK information for the second PDSCHs may be included in the second PUCCH. In other words, the HARQ-ACK information for the first PDSCHs may construct a different HARQ-ACK codebook from the HARQ-ACK information for the second PDSCHs.

And/or, the multiple PDSCHs may include first PDSCHs in which a HARQ-ACK transmission slot is indicated as a specific slot among PDSCHs transmitted in a first subslot of each slot, and second PDSCHs in which a HARQ-ACK transmission slot is indicated as a specific slot among PDSCHs transmitted in a second subslot of each slot. HARQ-ACK information for the first PDSCHs may be included in the first PUCCH, and HARQ-ACK information for the second PDSCHs may be included in the second PUCCH. Here, the fact that the HARQ-ACK transmission slot has been indicated as the specific slot may mean that a HARQ-ACK transmission timing (or processing time) of the corresponding PDSCH is determined and/or configured as a specific slot.

As above, methods proposed in the present disclosure may transmit a plurality of PUCCHs including a separately constructed HARQ-ACK codebook in one slot.

Here, a timing offset (or processing time) from a subslot and/or a slot transmitting a PDSCH to a subslot and/or a slot receiving HARQ-ACK of the corresponding PDSCH may be transmitted via a higher layer signal or a physical layer signal (e.g., DCI), and/or may be determined and/or configured according to a service type, etc. of the corresponding PDSCH. In addition, the timing offset may be configured based on the number of slots, the number of subslots, the number of symbols, and/or other transmission time units.

Here, the service type may be distinguished, determined and/or configured according to a service requirement, a TTI length, a numerology and/or a processing time, etc. for PDSCH data. For example, if the first PDSCH includes ultra-reliable low-latency communication (URLLC) data, and the second PDSCH includes enhanced Mobile Broad-Band (eMBB) data, it may be deemed that the first PDSCH and the second PDSCH have different service types.

And/or, the base station may transmit to the UE a physical downlink control channel (PDCCH) including a PUCCH resource indicator. The PUCCH resource indicator may be interworked with specific PUCCH resources (resource set). The PUCCH resource indicator may be interworked with multiple PUCCH resources transmitted in one slot. For example, the PUCCH resource indicator may be interworked with (resource set of) the first PUCCH and the second PUCCH, HARQ-ACK information for the first PDSCHs may be determined to be received via the first PUCCH among resources (the first PUCCH and the second PUCCH) interworked with the PUCCH resource indicator based on a processing time of the first PDSCHs, and HARQ-ACK information for the second PDSCHs may be determined to be received via the second PUCCH among resources interworked with the PUCCH resource indicator based on a processing time of the second PDSCHs.

And/or, if a processing time of the corresponding PDSCH is equal to or less than a preconfigured time, HARQ-ACK information of the corresponding PDSCH may be determined to be received from the first PUCCH, and if the processing time of the corresponding PDSCH is equal to or greater than the preconfigured time, HARQ-ACK information of the corresponding PDSCH may be received from the second PUCCH. Here, the processing time may be a time offset from a transmission time of the corresponding PDSCH to a reception time of the HARQ-ACK information. And/or, the processing time may mean a time required to compute the HARQ-ACK information for the corresponding PDSCH.

And/or, a HARQ-ACK information reception resource for PDSCH may be determined as one of PUCCH resources interworked with the PUCCH resource indicator, by a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

And/or, the base station may transmit to the UE PUCCH resource configuration information including a plurality of starting symbols and a length. In this instance, HARQ-ACK information for the first PDSCHs may be determined to be received via the first PUCCH by a first starting symbol and the length among the plurality of starting symbols and the length based on a processing time of the first PDSCHs, and HARQ-ACK information for the second PDSCHs may be determined to be received via the second PUCCH by a second starting symbol and the length among the plurality of starting symbols and the length based on a processing time of the second PDSCHs.

And/or, a HARQ-ACK information reception resource for PDSCH may be determined as one of PUCCH resources in one slot by a specific starting symbol and a length among a plurality of starting symbols and a length based on a service type of the corresponding PDSCH, a search space for a PDCCH scheduling the corresponding PDSCH, a DCI format included in a PDCCH scheduling the corresponding PDSCH, RNTI, CRC masking of a PDCCH, and/or a specific field (or information) in DCI.

The above description has been given on the assumption that the HARQ-ACK information for PDSCH is received via the PUCCH, but the proposed methods may be applied by replacing the PUCCH by the PUSCH even if the HARQ-ACK information for PDSCH is received via the PUSCH.

Since the operation method of the base station illustrated in FIG. 12 is the same as the operation method of the base station described with reference to FIGS. 1 to 11, a detailed description thereof is omitted.

Overview of Device to which the Present Disclosure is Applicable

FIG. 12 illustrates an example of an internal block diagram of a wireless communication device to which the present disclosure is applicable.

Referring to FIG. 12, a wireless communication system includes a base station 1210 and a plurality of UEs 1220 located in an area of the base station 1210. Hereinafter, the base station 1210 and the UE 1220 may be referred to as a wireless device.

The base station 1210 includes a processor 1211, a memory 1212, and a radio frequency (RF) unit 1213. The processor 1211 implements functions, processes, and/or methods described in FIGS. 1 to 11. Layers of a radio interface protocol may be implemented by the processor 1211. The memory 1212 is connected to the processor 1211 and stores various types of information for driving the processor 1211. The RF unit 1213 is connected to the processor 1211 and transmits and/or receives a radio signal.

The UE 1220 includes a processor 1221, a memory 1222, and a RF unit 1223. The processor 1221 implements functions, processes, and/or methods described in FIGS. 1 to 11. Layers of a radio interface protocol may be implemented by the processor 1221. The memory 1222 is connected to the processor 1221 and stores various types of information for driving the processor 1221. The RF unit 1223 is connected to the processor 1221 and transmits and/or receives a radio signal.

The memories 1212 and 1222 may be inside or outside the processors 1211 and 1221 and may be connected to the processors 1211 and 1221 through various well-known means.

The memories 1212 and 1222 may store programs for processing and controlling the processors 1211 and 1221 and may temporarily store input/output information.

The memories 1212 and 1222 may serve as a buffer.

Further, the base station 1210 and/or the UE 1220 may have a single antenna or multiple antennas.

FIG. 13 illustrates a block configuration diagram of a communication device according to an embodiment of the present disclosure.

In particular, FIG. 13 illustrates in more detail the UE illustrated in FIG. 12.

Referring to FIG. 13, the UE may include a processor (or digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (which is optional), a speaker 1345, and a microphone 1350. The UE may also include a single antenna or multiple antennas.

The processor 1310 implements functions, processes, and/or methods described in FIGS. 1 to 12. Layers of a radio interface protocol may be implemented by the processor 1310.

The memory 1330 is connected to the processor 1310 and stores information related to operations of the processor 1310. The memory 1330 may be inside or outside the processor 1310 and may be connected to the processors 1310 through various well-known means.

A user inputs instructional information, such as a telephone number, for example, by pushing (or touching) buttons of the keypad 1320 or by voice activation using the microphone 1350. The processor 1310 receives and processes the instructional information to perform an appropriate function, such as to dial the telephone number. Operational data may be extracted from the SIM card 1325 or the memory 1330. Further, the processor 1310 may display instructional information or operational information on the display 1315 for the user's reference and convenience.

The RF module 1335 is connected to the processor 1310 and transmits and/or receives a RF signal. The processor 1310 forwards instructional information to the RF module 1335 in order to initiate communication, for example, transmit a radio signal configuring voice communication data. The RF module 1335 consists of a receiver and a transmitter to receive and transmit the radio signal. The antenna 1340 functions to transmit and receive the radio signal. Upon reception of the radio signal, the RF module 1335 may forward a signal to be processed by the processor 1310 and convert the signal into a baseband. The processed signal may be converted into audible or readable information output via the speaker 1345.

FIG. 14 illustrates an example of a RF module of a wireless communication device to which a method proposed in the present disclosure is applicable.

More specifically, FIG. 14 illustrates an example of an RF module that can be implemented in a frequency division duplex (FDD) system.

First, in a transmission path, the processor illustrated in FIGS. 12 and 13 processes data to be transmitted and provides an analog output signal to a transmitter 1410.

In the transmitter 1410, the analog output signal is filtered by a low pass filter (LPF) 1411 to remove images caused by a digital-to-analog conversion (ADC), is up-converted from a baseband to an RF by an up-converter (mixer) 1412, and is amplified by a variable gain amplifier (VGA) 1413, and the amplified signal is filtered by a filter 1414, is additionally amplified by a power amplifier (PA) 1415, is routed through duplexer(s) 1450/antenna switch(es) 1460, and is transmitted through an antenna 1470.

Further, in a reception path, the antenna 1470 receives signals from the outside and provides the received signals, and the signals are routed through the antenna switch(es) 1460/duplexers 1450 and are provided to a receiver 1420.

In the receiver 1420, the received signals are amplified by a low noise amplifier (LNA) 1423, are filtered by a bans pass filter 1424, and are down-converted from the RF to the baseband by a down-converter (mixer) 1425.

The down-converted signal is filtered by a low pass filter (LPF) 1426 and is amplified by a VGA 1427 to obtain an analog input signal, and the analog input signal is provided to the processor illustrated in FIGS. 12 and 13.

Further, a local oscillator (LO) generator 1440 generates transmitted and received LO signals and provides them to the up-converter 1412 and the down-converter 1425, respectively.

In addition, a phase locked loop (PLL) 1430 receives control information from the processor in order to generate the transmitted and received LO signals at appropriate frequencies and provides control signals to the LO generator 1440.

The circuits illustrated in FIG. 14 may be arranged differently from the configuration illustrated in FIG. 14.

FIG. 15 illustrates another example of a RF module of a wireless communication device to which a method proposed in the present disclosure is applicable.

More specifically, FIG. 15 illustrates an example of an RF module that can be implemented in a time division duplex (TDD) system.

A transmitter 1510 and a receiver 1520 of the RF module in the TDD system have the same structure as the transmitter and the receiver of the RF module in the FDD system.

Hereinafter, only the structure of the RF module of the TDD system that differs from the RF module of the FDD system will be described, and the same structure will refers to the description of FIG. 14.

A signal amplified by a power amplifier (PA) 1515 of the transmitter 1510 is routed through a band select switch 1550, a band pass filter (BPF) 1560, and antenna switch(es) 1570 and is transmitted via an antenna 1580.

Further, in a reception path, the antenna 1580 receives signals from the outside and provides the received signals, and the signals are routed through the antenna switch(es) 1570, the band pass filter 1560, and the band select switch 1550 and are provided to the receiver 1520.

FIG. 16 illustrates an example of a signal processing module to which methods proposed in the present disclosure are applicable.

More specifically, FIG. 16 illustrates an example of a signal processing module structure in a transmitting device.

Hereinafter, the UE or the base station of FIG. 12 may be referred to as a transmitting device or a receiving device.

Here, the signal processing may be performed by processors of the base station/UE such as the processors 1211 and 1221 of FIG. 12.

Referring to FIG. 16, a transmitting device in a UE or a base station may include a scrambler 1601, a modulator 1602, a layer mapper 1603, an antenna port mapper 1604, a resource block mapper 1605, and a signal generator 1606.

The transmitting device may transmit one or more codewords. Each of coded bits in each codeword may be scrambled by the scrambler 1601 and transmitted on a physical channel. The codeword may be referred to as a data column and may be equivalent to a transport block that is a data block provided by a MAC layer.

The scrambled bits are modulated to complex-valued modulation symbols by the modulator 1602. The modulator 1602 may modulate the scrambled bits according to a modulation scheme and dispose the modulated bits as complex-valued modulation symbols representing a location on signal constellation. There is no restriction in the modulation scheme, and m-PSK (m-Phase Shift Keying) or m-QAM (m-Quadrature Amplitude Modulation), etc. may be used in the modulation of coded data. The modulator may be referred to as a modulation mapper.

The complex-valued modulation symbols may be mapped to one or more transport layers by the layer mapper 1603. The complex-valued modulation symbol on each layer may be mapped by the antenna port mapper 1604 for the transmission on an antenna port.

The resource block mapper 1605 may map the complex-valued modulation symbol for each antenna port to an appropriate resource element within a virtual resource block allocated for the transmission. The resource block mapper 1605 may map the virtual resource block to a physical resource block according to an appropriate mapping scheme. The resource block mapper 1605 may allocate the complex-valued modulation symbol for each antenna port to an appropriate subcarrier and multiplex it according to a user.

The signal generator 1606 may modulate the complex-valued modulation symbol, i.e., an antenna-specific symbol for each antenna port through a specific modulation scheme, for example, an orthogonal frequency division multiplexing (OFDM) scheme to generate a complex-valued time domain OFDM symbol signal. The signal generator 1606 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 1606 may include an IFFT module, a CP inserter, a digital-to-analog converter (DAC), a frequency up-converter, and the like.

FIG. 17 illustrates another example of a signal processing module to which methods proposed in the present disclosure are applicable.

More specifically, FIG. 17 illustrates another example of a signal processing module structure in a base station or a UE. Here, the signal processing may be performed by the processors of the base station/UE such as the processors 1211 and 1221 of FIG. 12.

Referring to FIG. 17, a transmitting device in a UE or a base station may include a scrambler 1701, a modulator 1702, a layer mapper 1703, a precoder 1704, a resource block mapper 1705, and a signal generator 1706.

The transmitting device may scramble coded bits within one codeword for the one codeword by the scrambler 1701 and then transmit it via a physical channel.

The scrambled bits are modulated to complex-valued modulation symbols by the modulator 1702. The modulator 1702 may modulate the scrambled bits according to a predetermined modulation scheme and dispose the modulated bits as complex-valued modulation symbols representing a location on signal constellation. There is no restriction in the modulation scheme, and pi/2-BPSK (pi/2-Binary Phase Shift Keying), m-PSK (m-Phase Shift Keying), or m-QAM (m-Quadrature Amplitude Modulation), etc. may be used in the modulation of coded data.

The complex-valued modulation symbols may be mapped to one or more transport layers by the layer mapper 1703.

The complex-valued modulation symbol on each layer may be precoded by the precoder 1704 for the transmission on an antenna port. Here, the precoder 1704 may perform a transform precoding on the complex-valued modulation symbols and then perform a precoding on the complex-valued modulation symbols. Alternatively, the precoder 1704 may perform the precoding on the complex-valued modulation symbols without performing the transform precoding. The precoder 1704 may process the complex-valued modulation symbols through a MIMO scheme according to multiple transmitting antennas to output antenna-specific symbols and may distribute the antenna-specific symbols to the corresponding resource block mapper 1705. An output z of the precoder 1704 may be obtained by multiplying an output y of the layer mapper 1703 by a precoding matrix W of NxM, where N is the number of antenna ports, and M is the number of layers.

The resource block mapper 1705 maps the complex-valued modulation symbol for each antenna port to an appropriate resource element within a virtual resource block allocated for the transmission.

The resource block mapper 1705 may allocate the complex-valued modulation symbols to appropriate subcarriers and multiplex them according to a user.

The signal generator 1706 may modulate the complex-valued modulation symbols through a specific modulation scheme, for example, an orthogonal frequency division multiplexing (OFDM) scheme to generate a complex-valued time domain OFDM symbol signal. The signal generator 1706 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 1706 may include an IFFT module, a CP inserter, a digital-to-analog converter (DAC), a frequency up-converter, and the like.

The signal processing of the receiving device may be configured in the reverse of the signal processing of the transmitter. Specifically, a processor of the receiving device performs decoding and demodulation on a radio signal received from the outside via antenna port(s) of the RF unit. The receiving device may include a plurality of multi-receiving antennas. Each signal received via the receiving antenna is recovered as a baseband signal, and then goes through multiplexing and MIMO demodulation and is recovered to a data column that the transmitting device originally intends to transmit. The receiving device may include a signal restorer for recovering a received signal as a baseband signal, a multiplexer for combining and multiplexing the received and processed signals, and a channel demodulator for modulating a multiplexed signal string to a corresponding codeword. The signal restorer, the multiplexer, and the channel demodulator may be configured as one integrated module to perform their functions or respective independent modules. More specifically, the signal restorer may include an analog-to-digital converter (ADC) for converting an analog signal into a digital signal, a CP remover for removing a CP from the digital signal, a FFT module which applies a fast Fourier transform (FFT) to a signal, from which the CP is removed, and outputs a frequency domain symbol, and a resource element demapper/an equalizer for recovering the frequency domain symbol as an antenna-specific symbol. The antenna-specific symbol is recovered to a transport layer by the multiplexer, and the transport layer is recovered by the channel demodulator to a codeword, that the transmitting device intends to transmit.

A radio device in the present disclosure may be a base station, a network node, a transmitter UE, a receiver UE, a radio device, a wireless communication device, a vehicle, a vehicle with an automatic driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

The UE in the present disclosure may include a cellular phone, a smart phone, a laptop computer, a digital broadcast terminal, a personal digital assistants (PDA), a portable multimedia player (PMP), a navigator, a slate PC, a tablet PC, an ultrabook, a wearable device (e.g., a smart watch, a smart glass, a head mounted display (HMD)), a foldable device, or the like. For example, the HMD may be a display device which is worn on the head, and may be used to implement the VR or AR device.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although various implementations for transmitting and receiving a physical uplink control channel in a wireless communication system according to the present disclosure have been described focusing on examples applying to the 3GPP LTE/LTE-A system, the 5G system (New RAT system), etc., such implementations can be applied to various wireless communication systems other than the 3GPP LTE/LTE-A system and the 5G system.

The invention claimed is:

1. A method of reporting, by a user equipment (UE), hybrid automatic repeat request (HARQ)-acknowledgement (ACK) information in a wireless communication system, the method comprising:
   receiving i) a first Physical Downlink Control Channel (PDCCH) based on a first control resource set (CORESET) and ii) a second PDCCH based on a second CORESET;
   receiving i) a first Physical Downlink Shared Channel (PDSCH) scheduled based on the first PDCCH and ii) a second PDSCH scheduled based on the second PDCCH; and
   reporting the HARQ-ACK information related to the first PDSCH and the second PDSCH, based on a Physical Uplink Control Channel (PUCCH),
   wherein, based on an index of a first CORESET group for the first CORESET and an index of a second CORESET group for the second CORESET being based on different values:
      i) a first HARQ-ACK codebook related to the first CORESET group and ii) a second HARQ-ACK codebook related to the second CORESET group are separately generated,
      a priority index associated with one of the first HARQ-ACK codebook and the second HARQ-ACK codebook is higher than a priority index associated with remaining one of the first HARQ-ACK codebook and the second HARQ-ACK codebook, and
      the HARQ-ACK information is reported based on the first HARQ-ACK codebook and the second HARQ-ACK codebook.

2. A user equipment (UE) configured to report hybrid automatic repeat request (HARQ)-acknowledgement (ACK) information in a wireless communication system, the UE comprising:
   a radio frequency (RF) unit configured to transmit and receive a radio signal; and
   a processor functionally connected to the RF unit, wherein the processor is configured to:
receive i) a first Physical Downlink Control Channel (PDCCH) based on a first control resource set (CORESET) and ii) a second PDCCH based on a second CORESET;
receive i) a first Physical Downlink Shared Channel (PDSCH) scheduled based on the first PDCCH and ii) a second PDSCH scheduled based on the second PDCCH; and
report the HARQ-ACK information related to the first PDSCH and the second PDSCH, based on a Physical Uplink Control Channel (PUCCH),
wherein, based on an index of a first CORESET group for the first CORESET and an index of a second CORESET group for the second CORESET being based on different values:
  i) a first HARQ-ACK codebook related to the first CORESET group and ii) a second HARQ-ACK codebook related to the second CORESET group are separately generated,
a priority index associated with one of the first HARQ-ACK codebook and the second HARQ-ACK codebook is higher than a priority index associated with remaining one of the first HARQ-ACK codebook and the second HARQ-ACK codebook, and
the HARQ-ACK information is reported based on the first HARQ-ACK codebook and the second HARQ-ACK codebook.

3. A method of receiving, by a base station (BS), hybrid automatic repeat request (HARQ)-acknowledgement (ACK) information in a wireless communication system, the method comprising:

transmitting i) a first Physical Downlink Control Channel (PDCCH) based on a first control resource set (CORESET) and ii) a second PDCCH based on a second CORESET;
transmitting i) a first Physical Downlink Shared Channel (PDSCH) scheduled based on the first PDCCH and ii) a second PDSCH scheduled based on the second PDCCH; and
receiving the HARQ-ACK informationf related to the first PDSCH and the second PDSCH, based on a Physical Uplink Control Channel (PUCCH),
wherein, based on an index of a first CORESET group for the first CORESET and an index of a second CORESET group for the second CORESET being based on different values:
  i) a first HARQ-ACK codebook related to the first CORESET group and ii) a second HARQ-ACK codebook related to the second CORESET group are separately generated,
a priority index associated with one of the first HARQ-ACK codebook and the second HARQ-ACK codebook is higher than a priority index associated with remaining one of the first HARQ-ACK codebook and the second HARQ-ACK codebook, and
the HARQ-ACK information is received based on the first HARQ-ACK codebook and the second HARQ-ACK codebook.

\* \* \* \* \*